United States Patent
Wang et al.

(10) Patent No.: US 9,578,326 B2
(45) Date of Patent: Feb. 21, 2017

(54) LOW-DELAY VIDEO BUFFERING IN VIDEO CODING

(71) Applicant: QUALCOMM Incorporated, San Diego, CA (US)

(72) Inventors: Ye-Kui Wang, San Diego, CA (US); Ying Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 835 days.

(21) Appl. No.: 13/776,063

(22) Filed: Feb. 25, 2013

(65) Prior Publication Data

US 2013/0266075 A1    Oct. 10, 2013

Related U.S. Application Data

(60) Provisional application No. 61/620,266, filed on Apr. 4, 2012, provisional application No. 61/641,063, filed on May 1, 2012.

(51) Int. Cl.
*H04N 19/44* (2014.01)
*H04N 19/70* (2014.01)
(Continued)

(52) U.S. Cl.
CPC ........ *H04N 19/00533* (2013.01); *H04N 19/44* (2014.11); *H04N 19/46* (2014.11); *H04N 19/70* (2014.11)

(58) Field of Classification Search
CPC ... H04N 19/70; H04N 19/188; G11B 27/3027; G11B 27/32
See application file for complete search history.

(56) References Cited

U.S. PATENT DOCUMENTS

| 8,102,919 B2 | 1/2012 | Chiba et al. |
| 8,254,455 B2 | 8/2012 | Wu et al. |

(Continued)

FOREIGN PATENT DOCUMENTS

| WO | 2008084184 A2 | 7/2008 |
| WO | 2008085935 A1 | 7/2008 |
| WO | 2010021665 A1 | 2/2010 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

(Continued)

*Primary Examiner* — Obafemi Sosanya
(74) *Attorney, Agent, or Firm* — Shumaker & Sieffert, P.A.

(57) ABSTRACT

As one example, a method of coding video data includes storing one or more decoding units of video data in a picture buffer. The method further includes obtaining a respective buffer removal time for the one or more decoding units, wherein obtaining the respective buffer removal time comprises receiving a respective signaled value indicative of the respective buffer removal time for at least one of the decoding units. The method further includes removing the decoding units from the picture buffer in accordance with the obtained buffer removal time for each of the decoding units. The method further includes coding video data corresponding to the removed decoding units, wherein coding the video data comprises decoding the at least one of the decoding units.

83 Claims, 7 Drawing Sheets

(51) Int. Cl.
*H04N 19/46* (2014.01)
*H04N 19/00* (2014.01)
*H04N 19/134* (2014.01)

(56) References Cited

U.S. PATENT DOCUMENTS

| | | | |
|---|---|---|---|
| 2004/0005007 A1 | 1/2004 | Viscito et al. | |
| 2004/0047423 A1 | 3/2004 | Viscito et al. | |
| 2006/0256851 A1* | 11/2006 | Wang | H04N 21/234327 375/240.01 |
| 2009/0168866 A1* | 7/2009 | Takahashi | H04N 19/134 375/240.01 |
| 2009/0190666 A1 | 7/2009 | Viscito et al. | |
| 2009/0316782 A1 | 12/2009 | Hosokawa | |
| 2010/0128779 A1 | 5/2010 | Chatterjee et al. | |
| 2011/0216837 A1* | 9/2011 | Luo | H04N 19/00 375/240.25 |
| 2011/0274180 A1 | 11/2011 | Lee et al. | |
| 2012/0033039 A1* | 2/2012 | Sasaki | H04N 13/0029 348/43 |
| 2013/0266076 A1 | 10/2013 | Wang et al. | |

OTHER PUBLICATIONS

Webb et al., "HRD Conformance for Real-time H.264 Video Encoding," Image Processing, 2007. ICIP 2007. IEEE International Conference on, IEEE, PI, Sep. 1, 2007, 4 pp. V-305, XP031158546, ISBN: 978-1-4244-1436-9.
Second Written Opinion from International Application No. PCT/US2013/027808, dated Jun. 16, 2014, 6 pp.
International Preliminary Report on Patentability—PCT/US2013/027808—The International Bureau of WIPO Geneva, Switzerland, Sep. 23, 2014, 10 pp.
Chen et al., "Conforming bitstreams starting with CRA pictures," Document: JCTVC-G319, 7th Meeting, Geneva, CH, Nov. 21-30, 2011, 6 pp.
Deshpande, "On Sub-picture Based CPB," Document: JCTVC-J0306, 10th Meeting, Stockholm, Sweden, Jul. 11-20, 2012, 8 pp.
International Search Report and Written Opinion—PCT/US2013/027808—ISA/EPO—Jul. 8, 2013, 17 pp.
"HRD/VBV Output Document," Document: JVT-D146, 4th Meeting, Klagenfurt, Austria, Jul. 22-26, 2002, 18 pp.
Kazui et al., "Market needs and practicality of sub-picture based CPB Operation," Document: JCTVC-H0215, 8th Meeting, San Jose, CA, Feb. 1-10, 2012, 4 pp.
Partial International Search Report—PCT/US2013/027808—ISA/EPO—May 27, 2013, 8 pp.
Wang Y.K., et al., "Sub-picture based CPB operation" Document: JCTVC-I0588r1, 9th Meeting, Geneva, CH, Apr. 27-May 7, 2012, 2 pp.

Wang et al., "Sub-picture-level low-delay CPB behavior," Document: JCTVC-I0349, 9th Meeting, Geneva, CH, Apr. 27-May 7, 2012, 3 pp.
Wang, "Mental cross-check of JCTVC-J0306 on sub-picture based CPB", Document: JCTVC-J0465, 10th Meeting, Stockholm, SE, Jul. 11-20, 2012, 1 pp.
International Search Report and Written Opinion—PCT/US2013/027815—ISA/EPO—May 27, 2013.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27- May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Kazui, "Enchancement on operation of coded picture buffer," Document: JCTVC-G188, 7th Meeting, Geneva, CH, Nov. 21-30, 2011, 5 pp.
ITU-T H.264, Series H: Audiovisual and Multimedia Systems, Infrastructure of audiovisual services—Coding of moving video, Advanced video coding for generic audiovisual services, The International Telecommunication Union. Mar. 2010, 674 pp.

\* cited by examiner

LOW-DELAY VIDEO BUFFERING IN VIDEO CODING

This application claims the benefit of U.S. Provisional Application No. 61/620,266, filed Apr. 4, 2012, and U.S. Provisional Application No. 61/641,063, filed May 1, 2012, the entire contents of each of which are incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, High-Efficiency Video Coding (HEVC) is a video coding standard being developed by the Joint Collaboration Team on Video Coding (JCT-VC) of ITU-T Video Coding Experts Group (VCEG) and ISO/IEC Motion Picture Experts Group (MPEG). A recent draft of the upcoming HEVC standard, referred to as "HEVC Working Draft 6" or "HEVC WD6," is described in document JCTVC-H1003, Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February, 2012, which, as of May 1, 2012, is downloadable from http://phenix.int-evey.fr/jct/doc_end_user/documents/8_San%20Jose/wg11/JCTVC-H1003-v22.zip.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

SUMMARY

In general, this disclosure describes various techniques to achieve reduced codec delay in an interoperable manner. In one example, these techniques may be achieved through a generic sub-picture based coded picture buffer (CPB) behavior.

In one example, a method of coding video data includes storing one or more decoding units of video data in a picture buffer. The method further includes obtaining a respective buffer removal time for the one or more decoding units, wherein obtaining the respective buffer removal time comprises receiving a respective signaled value indicative of the respective buffer removal time for at least one of the decoding units. The method further includes removing the decoding units from the picture buffer in accordance with the obtained buffer removal time for each of the decoding units. The method further includes coding video data corresponding to the removed decoding units, wherein coding the video data comprises decoding the at least one of the decoding units.

In another example, a device for coding video data is configured to store one or more decoding units of video data in a picture buffer. The device is further configured to obtain a respective buffer removal time for the one or more decoding units, wherein obtaining the respective buffer removal time comprises receiving a respective signaled value indicative of the respective buffer removal time for at least one of the decoding units. The device is further configured to remove the decoding units from the picture buffer in accordance with the obtained buffer removal time for each of the decoding units. The device is further configured to code video data corresponding to the removed decoding units, wherein coding the video data comprises decoding the at least one of the decoding units.

In another example, an apparatus for coding video data includes means for storing one or more decoding units of video data in a picture buffer. The apparatus further includes means for obtaining a respective buffer removal time for the one or more decoding units, wherein obtaining the respective buffer removal time comprises receiving a respective signaled value indicative of the respective buffer removal time for at least one of the decoding units. The apparatus further includes means for removing the decoding units from the picture buffer in accordance with the obtained buffer removal time for each of the decoding units. The apparatus further includes means for coding video data corresponding to the removed decoding units, wherein coding the video data comprises decoding the at least one of the decoding units.

In another example, a computer-readable storage medium comprises instructions stored thereon that, if executed, cause a processor to store one or more decoding units of video data in a picture buffer. The instructions further cause a processor to obtain a respective buffer removal time for the one or more decoding units, wherein obtaining the respective buffer removal time comprises receiving a respective signaled value indicative of the respective buffer removal time for at least one of the decoding units. The instructions further cause a processor to remove the decoding units from the picture buffer in accordance with the obtained buffer removal time for each of the decoding units. The instructions further cause a processor to code video data corresponding to the removed decoding units, wherein coding the video data comprises decoding the at least one of the decoding units.

In another example, a method includes processing video data in accordance with at least one of a plurality of video usability information (VUI) parameters. The plurality of VUI parameters includes a sub-picture coded picture buffer (CPB) parameters present flag (sub_pic_cpb_params_present_flag) that indicates a presence of sub-picture CPB parameters. The plurality of VUI parameters further includes a supplemental enhancement information (SEI) message including at least one a syntax element indicating a delay for a SchedSelIdx-th CPB between a time of arrival in a coded picture buffer (CPB) of a first bit of coded data associated with a first decoding unit in an access unit associated with a buffering period SEI message, and a time of removal from the CPB of the coded data associated with the first decoding unit, for the first buffering period after hypothetical reference decoder (HRD) initialization (initial_du_cpb_removal_delay), and a syntax element indicating, in combination with a syntax element indicating a CPB removal delay (cpb_removal_delay), an offset for the SchedSelIdx-th CPB to specify an initial delivery time of the first decoding unit to the CPB (initial_du_cpb_removal_delay_offset). The plurality of VUI parameters further includes an SEI message including at least one syntax element indicating a number of network access layer (NAL) units in a corresponding i-th decoding unit of the access unit with which the picture timing SEI message is associated (num_nalus_in_du_minus1), and a syntax element that specifies a number of clock ticks to wait after removal from the CPB of the first decoding unit in the access unit associated with the most recent buffering period SEI message in a preceding access unit before removing from the CPB the corresponding i-th decoding unit in the access unit associated with the picture timing SEI message (du_cpb_removal_delay).

The details of one or more examples are set forth in the accompanying drawings and the description below. Other features, objects, and advantages will be apparent from the description and drawings, and from the claims.

DETAILED DESCRIPTION

Figure 1:
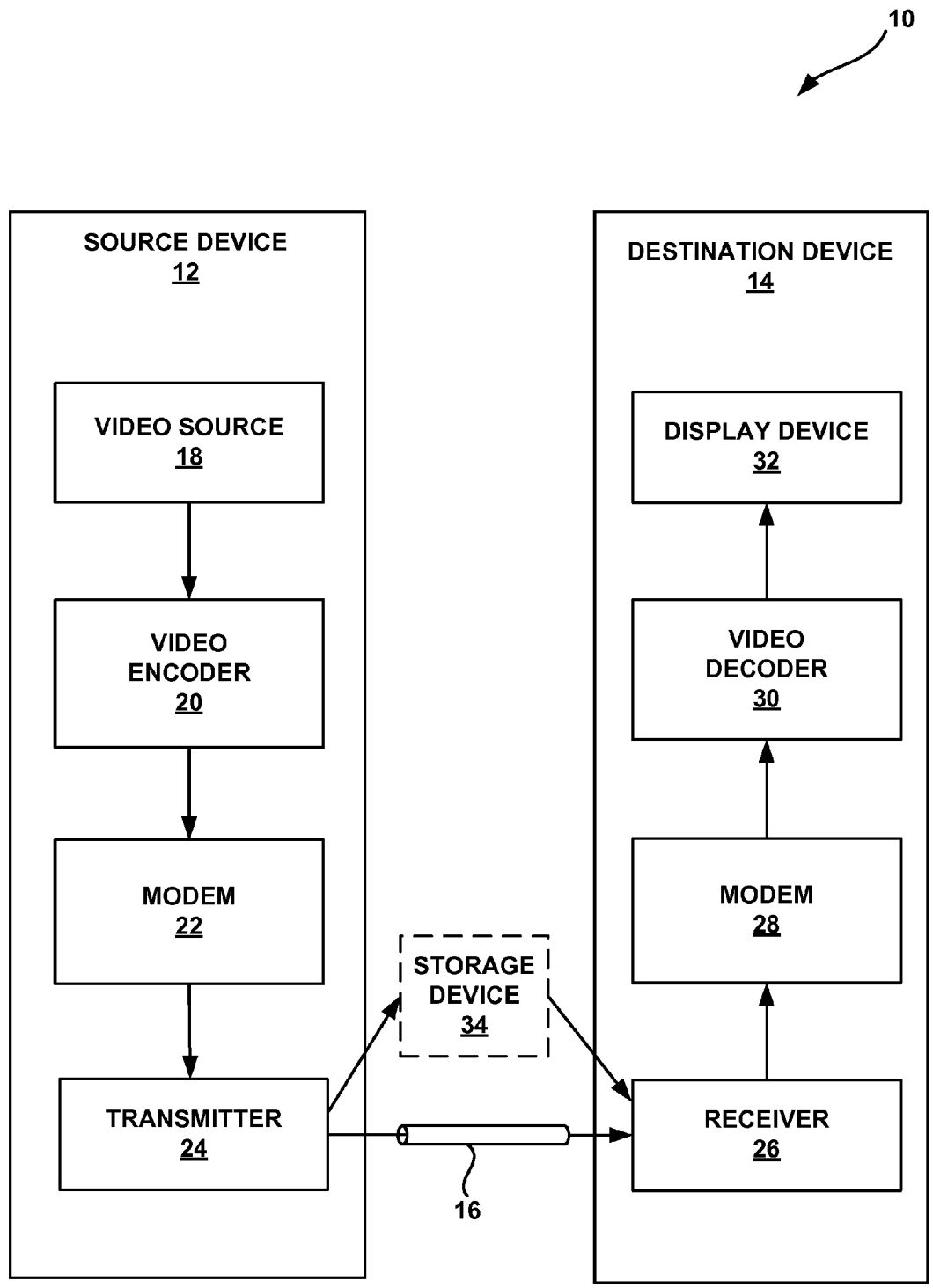
FIG. 1 is a block diagram illustrating an example video encoding and decoding system that may utilize techniques for deblocking edges between video blocks, in accordance with techniques of this disclosure.

Video applications may include local playback, streaming, broadcast/multicast and conversational applications. Conversational applications may include video telephony and video conferencing and are also referred to as low-delay applications. Conversational applications require a relatively low end-to-end delay of the entire systems, i.e., the delay between the time when a video frame is captured and the time when the video frame is displayed. Typically, acceptable end-to-end delay for conversational applications should be less than 400 milliseconds (ms), and an end-to-end delay of around 150 ms may be considered very good. Each processing step may contribute to the overall end-to-end delay, e.g., capturing delay, pre-processing delay, encoding delay, transmission delay, reception buffering delay (for de-jittering), decoding delay, decoded picture output delay, post-processing delay, and display delay. Thus, typically, the codec delay (encoding delay, decoding delay and decoded picture output delay) should be minimized in conversational applications. In particular, the coding structure should ensure that the pictures' decoding order and output order are identical such that the decoded picture output delay is equal to zero.

Video coding standards may include a specification of a video buffering model. In AVC and HEVC, the buffering model is referred to as a hypothetical reference decoder (HRD), which includes a buffering model of both the coded picture buffer (CPB) and the decoded picture buffer (DPB), and the CPB and DPB behaviors are mathematically specified. The HRD directly imposes constraints on different timing, buffer sizes and bit rate, and indirectly imposes constraints on bitstream characteristics and statistics. A complete set of HRD parameters include five basic parameters: initial CPB removal delay, CPB size, bit rate, initial DPB output delay, and DPB size.

In AVC and HEVC, bitstream conformance and decoder conformance are specified as parts of the HRD specification. Though it is named as a type of decoder, HRD is typically needed at the encoder side to guarantee bitstream conformance, while typically not needed at the decoder side. Two types of bitstream or HRD conformance, namely Type I and Type II, are specified. Also, two types of decoder conformance, output timing decoder conformance and output order decoder conformance are specified.

In the AVC and HEVC HRD models, decoding or CPB removal is access unit based, and it is assumed that picture decoding is instantaneous. In practical applications, if a conforming decoder strictly follows the decoding times signaled, e.g., in the picture timing supplemental enhancement information (SEI) messages, to start decoding of access units, then the earliest possible time to output a particular decoded picture is equal to the decoding time of that particular picture plus the time needed for decoding that particular picture. Unlike the AVC and HEVC HRD models, the time needed for decoding a picture in the real world is not equal to zero. The terms "instantaneous" and "instantaneously" as used throughout this disclosure may refer to any duration of time that may be assumed to be instantaneous in one or more coding models or an idealized aspect of any one or more coding models, with the understanding that this may differ from being "instantaneous" in a physical or literal sense. For example, for purposes of this disclosure, a function or process may be considered to be nominally "instantaneous" if it takes place at or within a practical margin of a hypothetical or idealized earliest possible time for the function or process to be performed. Syntax and variable names as used herein may in some examples be understood in accordance with their meaning within the HEVC model.

A sub-picture based CPB behavior was proposed in "Enhancement on operation of coded picture buffer," Kazui et al., Joint Collaborative Team on Video Coding (JCT-VC) of ITU-T SG16 WP3 and ISO/IEC JTC1/SC29/WG11, 7$^{th}$ Meeting: Geneva, CH 21-30, Nov. 2011, JCTVC-G188 (available at http://phenix.int-evey.fr/jct/doc_end_user/documents/7 Geneva/wg11/JCTVC-G188-v2.zip) in order to achieve coding delay of less than one picture period in an interoperable way. The JCTVC-G188 method may be summarized as follows: a picture may be evenly divided into M groups of treeblocks, i.e., the first M treeblocks in a treeblock raster scan of the picture belong to the first group of treeblocks, the second M treeblocks in the treeblock raster scan of the picture belong to the second group of treeblocks, and so on. The value M may be signaled in buffering period SEI messages. This value may be used to derive the CPB removal time (i.e., the decoding time) of each group of treeblocks. In this sense, the JCTVC-G188 CPB behavior is sub-picture based, wherein each sub-picture is a group of treeblocks. In some examples, a sub-picture may correspond to one or more slices, one or more waves (for wavefront partitioning of a picture), or one or more tiles. It is assumed in this method of JCTVC-G188 that access unit level CPB removal times are signaled as usual (using picture timing SEI messages), and within each access unit, the CPB removal times for the treeblock groups are assumed to linearly or evenly divide the interval from the CPB removal time of the previous access unit to the CPB removal time of the current access unit.

This method of JCTVC-G188 further implies the following assumptions or bitstream requirements: (1) within each picture each treeblock group is encoded in a way that requires the same amount of decoding time (not just in the HRD model but also for real-world decoders), wherein the coded data of the first treeblock group is considered to include all non-VCL (Video Coding Layer) NAL (Network Abstraction Layer) units in the same access unit and before the first VCL NAL unit; (2) within each picture, the number of bits for each treeblock group is identical, wherein the coded data of the first treeblock group is considered to include all non-VCL NAL units in the same access unit and before the first VCL NAL unit.

Existing methods for specifying a sub-picture based CPB behavior are associated with at least the following problems: (1) The requirement that the amount of coded data for each treeblock group in a coded picture is identical is hard to achieve with a balanced coding performance (wherein treeblock groups for areas with more detailed texture or motion activity in a picture may use more bits). (2) When more than one treeblock group is included in a slice, there may be no easy way to split the coded bits of treeblocks belonging to different treeblock groups and separately send them at the encoder side and separately remove them from the CPB (i.e., separately decode them).

To address the above problems, this disclosure describes a generic design for support of sub-picture based CPB behavior, with various alternatives. In some examples, the features of sub-picture based CPB techniques of this disclosure may include aspects of the following techniques: (1) Each sub-picture may include a number of coding blocks of a coded picture continuous in decoding order. A coding block may be identical to a treeblock or a subset of a treeblock; (2) Coding of sub-pictures and allocation of bits to different sub-pictures in a picture may be performed as usual, without assuming or requiring that each sub-picture (i.e., treeblock group) in one picture is coded with the same amount of bits. Consequently, the CPB removal time for each sub-picture may be signaled in the bitstream instead of being derived according to the signaled picture-level CPB removal times; (3) When more than one sub-picture is included in a slice, byte alignment may be applied at the end of each sub-picture, in contrast, for example, to byte alignment for tiles in HEVC WD6. Furthermore, the entry point of each sub-picture, except for the first one in the coded picture, may be signaled, in contrast, for example, to byte alignment for tiles in HEVC WD6. The received signaled value may be indicative of the byte alignment of at least one of the sub-pictures within a larger set of the video data, such as a slice, a tile, or a frame, for example. Each of features (1)-(3) may be applied independently or in combination with the other ones.

In one example, the HRD operation, including the sub-picture based CPB behavior, may be summarized as follows: When the signaling indicates that the sub-picture based CPB behavior is in use, e.g., through a sequence-level signaling of a syntax element sub_pic_cpb_flag equal to 1, CPB removal or decoding is based on sub-picture, or equivalently, decoding unit, that may be an access unit or a subset of an access unit. In other words, each time a decoding unit, whether an access unit or a subset of an access unit, is removed from the CPB for decoding, the removal time of a decoding unit from the CPB may be derived from a signaled initial CPB removal delay and the CPB removal delay signaled for the decoding unit. A CPB underflow is specified as the condition in which the nominal CPB removal time of decoding unit m $t_{r,n}(m)$ is less than the final CPB removal time of decoding unit m $t_{af}(m)$ for any value of m. In one example, when a syntax element low_delay_hrd_flag is equal to 0, it is required that the CPB never underflows.

In one example, the DPB output and removal processes may still operate at the picture level or access unit level, i.e., each time an entire decoded picture is output or removed from the DPB. Removal of decoded pictures from the DPB may happen instantaneously at the CPB removal time of the first decoding unit of access unit n (containing the current picture).

FIG. 1 is a block diagram illustrating an example video encoding and decoding system 10 that may utilize techniques for storing one or more decoding units of video data in a picture buffer, obtaining a respective buffer removal time for the one or more decoding units, removing the decoding units from the picture buffer in accordance with the obtained buffer removal time for each of the decoding units, and coding video data corresponding to the removed decoding units, among other functions.

As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless. The techniques of this disclosure, however, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless, wired, or storage media suitable for transmission or storage of encoded video data.

Alternatively, encoded data may be output from transmitter 24 to a storage device 34. Similarly, encoded data may be accessed from storage device 34 by receiver 26. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server, a virtual server, a data center, a redundant network of data centers, or another intermediate storage device that may hold the encoded video generated by source device 12. Destination device 14 may access stored video data from storage device 34 via streaming or download. A file server implementation of storage device 34 or a portion thereof may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a remote or non-local storage device 34. The transmission of encoded video data from storage device 34 may be a streaming transmission, a download transmission, or a combination of both.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for storing one or more decoding units of video data in a picture buffer, obtaining a respective buffer removal time for the one or more decoding units, removing the decoding units from the picture buffer in accordance with the obtained buffer removal time for each of the decoding units, and coding video data corresponding to the removed decoding units, among other functions. In other examples, a source device and a destination device may include other components or arrangements. For example, source device 12 may receive video data from an external video source rather than integrated video source 18, such as an external camera. Likewise, destination device 14 may interface with an external display device, rather than including an integrated display device 32.

The illustrated system 10 of FIG. 1 is merely one example. Techniques for storing one or more decoding units of video data in a picture buffer, obtaining a respective buffer removal time for the one or more decoding units, removing the decoding units from the picture buffer in accordance with the obtained buffer removal time for each of the decoding units, and coding video data corresponding to the removed decoding units may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to store one or more decoding units of video data in a picture buffer, obtain a respective buffer removal time for the one or more decoding units, remove the decoding units from the picture buffer in accordance with the obtained buffer removal time for each of the decoding units, and code video data corresponding to the removed decoding units, among other functions. The information communicated over channel 16 may include syntax information defined by video encoder 20, which may also be used by video decoder 30, that includes syntax elements that describe characteristics and/or processing of macroblocks, coding tree units, slices, and other coded units, for example, groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14. In other examples, source device 12 may store encoded data onto a storage medium such as in storage device 24, rather than transmitting the data. Likewise, destination device 14 may be configured to retrieve encoded data from storage device 24 or another storage medium or device.

Video encoder 20 and video decoder 30 may operate according to a video compression standard, such as those described herein. The techniques of this disclosure, however, are not limited to any particular coding standard. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), wireless communication devices that include a video coding device, such as encoder or decoder, discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or other device.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks, also referred to as coding units (CUs), within individual video frames in order to encode the video data. A video block may correspond to a largest coding unit (LCU) or a partition of an LCU. The video blocks may have fixed or varying sizes, and may differ in size according to a specified coding standard. Each video frame may include a plurality of slices. Each slice may include a plurality of LCUs, which may be arranged into partitions, also referred to as sub-CUs. An LCU may also be referred to as a coding tree unit.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, blocks and the various partitions, sometimes referred to as sub-blocks, may be considered video blocks. In addition, a slice may be considered to be a plurality of video blocks, such as blocks and/or sub-blocks. Each slice may be an independently decodable unit of a video frame. Alternatively, frames themselves may be decodable units, or other portions of a frame may be defined as decodable units. The term "coded unit" may refer to any independently decodable unit of a video frame such as an entire frame or a slice of a frame, a group of pictures (GOP) also referred to as a coded video sequence, or another independently decodable unit defined according to applicable coding techniques.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

HEVC refers to a block of video data as a coding unit (CU), which may include one or more prediction units (PUs) and/or one or more transform units (TUs). This disclosure may also use the term "block" to refer to any of a CU, PU, or TU. Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU).

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs may also be referred to as leaf-CUs although the 16×16 CU has not been split.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split may be referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

A leaf-CU may include one or more transform units (TUs). The transform units may be specified using a TU quadtree structure, as discussed above. That is, a split flag may indicate whether a leaf-CU is split into four transform units. Then, each transform unit may be split further into 4 sub TUs. When a TU is not split further, it may be referred to as a leaf-TU. In general, a split flag may indicate that a leaf-TU is split into square-shaped TUs. In order to indicate that a TU is split into non-square shaped TUs, other syntax data may be included, for example, syntax data that indicates that TUs are to be partitioned according to non-square quadtree transform (NSQT).

Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the predictive values corresponding to the TU and the original block. The residual value may be transformed, quantized, and scanned. For inter coding, a video encoder may perform prediction at the PU level and may calculate a residual for each PU. The residual values corresponding to a leaf-CU may be transformed, quantized, and scanned. For inter coding, a leaf-TU may be larger or smaller than a PU. For intra coding, a PU may be collocated with a corresponding leaf-TU. In some examples, the maximum size of a leaf-TU may be the size of the corresponding leaf-CU.

In general, this disclosure uses the terms CU and TU to refer to leaf-CU and leaf-TU, respectively, unless noted otherwise. In general, the techniques of this disclosure relate to transforming, quantizing, scanning, and entropy encoding data of a CU. As an example, the techniques of this disclosure include selection of a transform to use to transform a residual value of an intra-predicted block based on an intra-prediction mode used to predict the block. This disclosure also uses the term "directional transform" or "designed transform" to refer to such a transform that depends on intra-prediction mode direction. That is, a video encoder may select a directional transform to apply to a transform unit (TU). As noted above, intra-prediction includes predicting a TU of a current CU of a picture from previously coded CUs and TUs of the same picture. More specifically, a video encoder may intra-predict a current TU of a picture using a particular intra-prediction mode.

Following quantization, entropy coding of the quantized data may be performed, e.g., according to content adaptive variable length coding (CAVLC), context adaptive binary arithmetic coding (CABAC), probability interval partitioning entropy coding (PIPE), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or other syntax information.

Video encoder 20 may be configured to perform inverse quantization and inverse transformation to store decoded blocks to be used as reference for predicting subsequent blocks, e.g., in the same frame or frames to be temporally predicted. Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

In accordance with the techniques of this disclosure, video encoder 20 and/or video decoder 30 may be configured to store one or more decoding units of video data in a picture buffer, obtain a respective buffer removal time for the one or more decoding units, remove the decoding units from the picture buffer in accordance with the obtained buffer removal time for each of the decoding units, and code video data corresponding to the removed decoding units, among other functions.

The following definitions are provided with respect to an example video encoder 20 and/or video decoder 30 configured to store one or more decoding units of video data in a picture buffer, obtain a respective buffer removal time for the one or more decoding units, remove the decoding units from the picture buffer in accordance with the obtained buffer removal time for each of the decoding units, and code video data corresponding to the removed decoding units, among other functions.

For purposes of describing one set of examples, the term "decoding unit" may be defined as follows:

Decoding unit: an access unit or a subset of an access unit. If sub_pic_cpb_flag is equal to 0, a decoding unit is an access unit; otherwise a decoding unit is a subset of an access unit. When sub_pic_cpb_flag is equal to 1, the first decoding unit in an access unit includes all non-VCL NAL units in the access unit and the first VCL NAL unit in the same access unit, and each other decoding unit in the access unit is a coded slice NAL unit that is not the first coded slice NAL unit in the access unit.

For purposes of describing a second set of examples, the term "decoding unit" may be defined as follows, with an additional definition of the term "sub-picture" as is used in the corresponding example definition of "decoding unit":

Decoding unit: an access unit or a subset of an access unit. If sub_pic_cpb_flag is equal to 0, a decoding unit is an access unit; otherwise a decoding unit is a subset of an access unit. When sub_pic_cpb_flag is equal to 1, the first decoding unit in an access unit includes all non-VCL NAL units in the access unit and the first sub-picture of the picture in the same access unit, and each other decoding unit in the access unit is a sub-picture that is not the first sub-picture in the access unit.

Sub-picture: a number of coding blocks of a coded picture continuous in decoding order.

In the definition according to the second set of examples provided above, when more than one sub-picture is included in a slice, byte alignment may be applied at the end of each sub-picture, in contrast, for example, to byte alignment for tiles in HEVC WD6. Furthermore, the entry point of each sub-picture, except for the first one in the coded picture, may be signaled.

In some alternatives, when the bitstream contains multiple scalable layers or views, a decoding unit may be defined as a layer representation or a view component. All non-VCL units preceding the first VCL NAL unit of a layer representation or view component also belong to the decoding unit containing the layer representation or view component.

The following descriptions of example hypothetical reference decoder (HRD) operation, example operation of a coded picture buffer, example timing of a bitstream arrival, example timing of decoding unit removal, example decoding of a decoding unit, example operation of a decoded picture buffer, example removal of pictures from a decoded picture buffer, example picture output, and example current decoded picture marking and storage are provided to illustrate examples of video encoder 20 and/or video decoder 30 that may be configured to store one or more decoding units of video data in a picture buffer, obtain a respective buffer removal time for the one or more decoding units, remove the decoding units from the picture buffer in accordance with the obtained buffer removal time for each of the decoding units, and code video data corresponding to the removed decoding units, among other functions. The operations may be defined or performed differently, in other examples. In this manner, video encoder 20 and/or video decoder 30 may be configured to operate according to the various examples of HRD operations described below.

As one example, an HRD operation may be described in summary as follows: the CPB size (number of bits) is CpbSize[SchedSelIdx]. The DPB size (number of picture storage buffers) for temporal layer X is max_dec_pic_buffering[X]+1 for each X in the range of 0 to max_temporal_layers_minus1, inclusive. In this example, the HRD may operate as follows: data associated with access units that flow into the CPB according to a specified arrival schedule may be delivered by the hypothetical stream scheduler (HSS), i.e., a delivery scheduler. The data associated with each decoding unit may be removed and decoded instantaneously by the instantaneous decoding process at CPB removal times. Each decoded picture may be placed in the DPB. A decoded picture may be removed from the DPB at the latter of the DPB output time or the time that it becomes no longer needed for inter-prediction reference.

The arithmetic in these examples may be done with real values, so that no rounding errors propagate. For example, the number of bits in a CPB just prior to or after removal of a decoding unit is not necessarily an integer.

The variable $t_c$ may be derived as follows and may be called a clock tick:

$$t_c = \text{num\_units\_in\_tick} \div \text{time\_scale} \quad \text{(C-1)}$$

The following may be specified for expressing the constraints in an example annex modification to HEVC:

let access unit n be the n-th access unit in decoding order with the first access unit being access unit 0;

let picture n be the coded picture or the decoded picture of access unit n;

let decoding unit m be the m-th decoding unit in decoding order with the first decoding unit being decoding unit 0.

Some example techniques for operation of a coded picture buffer (CPB) are described as follows. According to some video coding techniques, various methods of CPB operation may be implemented. The specifications in the section of HEVC WD6 on CPB operations may be modified by this disclosure, and may apply independently to each set of CPB parameters that is present and to both the Type I and Type II conformance points.

Some examples involving timing of bitstream arrival are described as follows. The HRD may be initialized at any one of the buffering period supplemental enhancement information (SEI) messages. Prior to initialization, the CPB may be empty. After initialization, the HRD may not be initialized again by subsequent buffering period SEI messages.

The access unit that is associated with the buffering period SEI message that initializes the CPB may be referred to as access unit 0. Each decoding unit may be referred to as decoding unit m, where the number m identifies the particular decoding unit. The first decoding unit in decoding order in access unit 0 may be referred to as decoding unit 0. The value of m may be incremented by 1 for each subsequent decoding unit in decoding order.

The time at which the first bit of decoding unit m begins to enter the CPB may be referred to as the initial arrival time $t_{ai}(m)$. The initial arrival time of decoding units may be derived as follows:

if the decoding unit is decoding unit 0, $t_{ai}(0)=0$, otherwise (the decoding unit is decoding unit m with m>0), the following may apply:

if cbr_flag[SchedSelIdx] is equal to 1, the initial arrival time for decoding unit m is equal to the final arrival time (which is derived below) of decoding unit m−1, i.e., $$t_{ai}(m) = t_{af}(m-1) \quad \text{(C-2)}$$

otherwise (cbr_flag[SchedSelIdx] is equal to 0), the initial arrival time for decoding unit m is derived by:

$$t_{ai}(m) = \text{Max}(t_{af}(m-1), t_{ai,earliest}(m)) \quad \text{(C-3)}$$

where $t_{ai,earliest}(m)$ is derived as follows.

If decoding unit m is not the first decoding unit of a subsequent buffering period, $t_{ai,earliest}(m)$ may be derived as:

$$t_{ai,earliest}(m) = t_{r,n}(m) - (\text{initial\_cpb\_removal\_delay}$$
$$[\text{SchedSelIdx}] + \text{initial\_cpb\_removal\_delay\_offset}$$
$$[\text{SchedSelIdx}]) \div 90000 \quad \text{(C-4)}$$

with tr,n(m) being the nominal removal time of decoding unit m from the CPB as specified and initial_cpb_removal_delay[SchedSelIdx] and initial_cpb_removal_delay_offset[SchedSelIdx] being specified in the previous buffering period SEI message;

otherwise (decoding unit m is the first decoding unit of a subsequent buffering period), tai,earliest(m) may be derived as:

$$t_{ai,earliest}(m)=t_{r,n}(m)-(\text{initial\_cpb\_removal\_delay}[\text{SchedSelIdx}]\div 90000) \quad \text{(C-5)}$$

with initial_cpb_removal_delay[SchedSelIdx] being specified in the buffering period SEI message associated with the access unit containing decoding unit m.

The final arrival time for decoding unit m may be derived by:

$$t_{af}(m)=t_{ai}(m)+b(m)\div\text{BitRate}[\text{SchedSelIdx}] \quad \text{(C-6)}$$

where b(m) may be the size in bits of decoding unit m, counting the bits of the VCL NAL units and the filler data NAL units for the Type I conformance point or all bits of the Type II bitstream for the Type II conformance point.

In some examples, the values of SchedSelIdx, BitRate[SchedSelIdx], and CpbSize[SchedSelIdx] may be constrained as follows:
  If the content of the active sequence parameter sets for the access unit containing decoding unit m and the previous access unit differ, the HSS selects a value SchedSelIdx) of SchedSelIdx from among the values of SchedSelIdx provided in the active sequence parameter set for the access unit containing decoding unit m that results in a BitRate[SchedSelIdx1] or CpbSize[SchedSelIdx)] for the access unit containing decoding unit m. The value of BitRate[SchedSelIdx)] or CpbSize[SchedSelIdx)] may differ from the value of BitRate[SchedSelIdx0] or CpbSize[SchedSelIdx0] for the value SchedSelIdx0 of SchedSelIdx that was in use for the previous access unit;
  otherwise, the HSS continues to operate with the previous values of SchedSelIdx, BitRate[SchedSelIdx] and CpbSize[SchedSelIdx].

When the HSS selects values of BitRate[SchedSelIdx] or CpbSize[SchedSelIdx] that differ from those of the previous access unit, the following may apply in some examples:
  the variable BitRate[SchedSelIdx] comes into effect at time tai(m)
  the variable CpbSize[SchedSelIdx] comes into effect as follows:
  if the new value of CpbSize[SchedSelIdx] exceeds the old CPB size, it comes into effect at time $t_{ai}(m)$,
  otherwise, the new value of CpbSize[SchedSelIdx] comes into effect at the CPB removal time of the last decoding unit of the access unit containing decoding unit m.

When sub_pic_cpb_flag is equal to 1, the initial CPB arrival time of access unit n $t_{ai}(n)$ may be set to the initial CPB arrival time of the first decoding unit in access unit n, and the final CPB arrival time of access unit n $t_{af}(n)$ may be set to the final CPB arrival time of the last decoding unit in access unit n.

Some examples involving timing of decoding unit removal and decoding of a decoding unit are described as follows. When a decoding unit m is the decoding unit with m equal to 0 (the first decoding unit of the access unit that initializes the HRD), the nominal removal time of the decoding unit from the CPB may be specified by:

$$t_{r,n}(0)=\text{initial\_cpb\_removal\_delay}[\text{SchedSelIdx}]\div 90000 \quad \text{(C-7)}$$

When a decoding unit m is the first decoding unit of the first access unit of a buffering period that does not initialize the HRD, the nominal removal time of the decoding unit from the CPB may be specified by:

$$t_{r,n}(m)=t_{r,n}(m_b)+t_c*\text{cpb\_removal\_delay}(m) \quad \text{(C-8)}$$

where $t_{r,n}(m_b)$ is the nominal removal time of the first decoding unit of the previous buffering period and cpb_removal_delay(m) is the value of cpb_removal_delay[i] for decoding unit m specified in the picture timing SEI message associated with the access unit containing decoding unit m.

When a decoding unit n is the first decoding unit of a buffering period, $m_b$ may be set equal to m at the removal time $t_{r,n}(m)$ of the decoding unit n. The nominal removal time $t_{r,n}(m)$ of a decoding unit m that is not the first decoding unit of a buffering period may be given by:

$$t_{r,n}(m)=t_{r,n}(m_b)+t_c*\text{cpb\_removal\_delay}(m) \quad \text{(C-9)}$$

where $t_{r,n}(m_b)$ is the nominal removal time of the first decoding unit of the current buffering period and cpb_removal_delay(m) is the value of cpb_removal_delay[i] for decoding unit m specified in the picture timing SEI message associated with the access unit containing decoding unit m.

The removal time of decoding unit m may be specified as follows:
  if low_delay_hrd_flag is equal to 0 or tr,n(m)>=taf(m), the removal time of decoding unit n may be specified by:

$$t_r(m)=t_{r,n}(m) \quad \text{(C-10)}$$

otherwise (low_delay_hrd_flag is equal to 1 and $t_{r,n}(m)< t_{af}(m)$), the removal time of decoding unit m is specified by:

$$t_r(m)=t_{r,n}(m)+t_c*\text{Ceil}((t_{af}(m)-t_{r,n}(m))\div t_c) \quad \text{(C-11)}$$

The latter case indicates that the size of decoding unit m, b(m), is so large that it prevents removal at the nominal removal time.

When sub_pic_cpb_flag is equal to 1, the nominal CPB removal time of access unit n $t_{r,n}(n)$ may be set to the normal CPB removal time of the last decoding unit in access unit n, the CPB removal time of access unit n $t_r(n)$ may be set to the CPB removal time of the last decoding unit in access unit n.

In some examples, at CPB removal time of decoding unit m, the decoding unit may be instantaneously decoded.

Some examples of operation of the decoded picture buffer (DPB) are described as follows. The decoded picture buffer may contain picture storage buffers. Each of the picture storage buffers may contain a decoded picture that is marked as "used for reference" or is held for future output. Prior to initialization, the DPB may be empty (the DPB fullness is set to zero). The following steps of these examples of the techniques of this disclosure may happen in the sequence listed.

Some examples of removal of pictures from the decoded picture buffer (DPB) are described as follows. In some examples, removal of pictures from the DPB before decoding of the current picture (but after parsing the slice header of the first slice of the current picture) may happen instantaneously at the CPB removal time of the first decoding unit of access unit n (containing the current picture) and may proceed as follows.

The decoding process for reference picture set as specified in subclause 8.3.2 of HEVC WD6 may be invoked. If the current picture is an instantaneous decoder refresh (IDR) picture, the following may apply:
  1. When the IDR picture is not the first IDR picture decoded (e.g., when a no output of prior pictures flag has a value not equal to 1) and the value of pic_width_in_luma_samples (e.g., a picture width in luma samples) or pic_height_in_luma_samples or max_dec_pic_buffering derived from the active sequence parameter set is different from the value of pic_width_in_luma_samples or pic_height_in_luma_samples or max_dec_pic_buffering derived from the sequence parameter set that was active for the preceding picture, respectively, no_output_of_prior_pics_flag may be inferred to be equal to 1 or set to be equal to 1 by the HRD, regardless of the actual value of no_output_of_prior_pics_flag. Decoder implementations may handle picture or DPB size changes more gracefully than the HRD in regard to changes in pic_width_in_luma_samples or pic_height_in_luma_samples.

2. When no_output_of_prior_pics_flag is equal to 1 or is set to or inferred to be equal to 1, all picture storage buffers in the DPB may be emptied without output of the pictures they contain, and DPB fullness may be set to 0.

All pictures k in the DPB, for which all of the following conditions are true, may be removed from the DPB: picture k is marked as "unused for reference"; picture k has PicOutputFlag equal to 0 or its DPB output time is less than or equal to the CPB removal time of the first decoding unit (denoted as decoding unit m) of current picture n; i.e., $$t_{o,dpb}(k) <= t_r(m)$$

When a picture is removed from the DPB, the DPB fullness may be decremented by one.

Some examples of picture output are described as follows. The following may happen instantaneously at the CPB removal time of the last decoding unit (denoted as decoding unit m) of access unit n (containing the current picture), $t_r(m)$. Picture n may be considered as decoded after the last decoding unit of the picture is decoded.

The variable maxPicOrderCnt (for maximum picture order count (POC)) may be set equal to the maximum of the PicOrderCntVal (for picture order count (POC) value) values for the current picture and all pictures in the DPB that are currently marked as "used for short-term reference" or that have DPB output time greater than tr(m). The variable minPicOrderCnt (for minimum picture order count (POC), i.e., smallest picture order count (POC)) may be set equal to the minimum of the PicOrderCntVal for the current picture and all pictures in the DPB that are currently marked as "used for short-term reference" or that have DPB output time greater than tr(m). It may be a requirement of bitstream conformance that the value of maxPicOrderCnt−minPicOrderCnt shall be less than MaxPicOrderCntLsb/2.

When picture n has PicOutputFlag equal to 1, its DPB output time $t_{o,dpb}(n)$ may be derived by:

$$t_{o,dpb}(n) = t_r(m) + t_c * dpb\_output\_delay(n) \quad (C-12)$$

where dpb_output_delay(n) is the value of dpb_output_delay specified in the picture timing SEI message associated with access unit n. The output of the current picture may be specified as follows:

if PicOutputFlag is equal to 1 and $t_{o,dpb}(n)=tr(m)$, the current picture is output;

otherwise, if PicOutputFlag is equal to 0, the current picture is not output, but may be stored in the DPB as specified further below;

otherwise (PicOutputFlag is equal to 1 and $t_{o,dpb}(n) > tr(m)$), the current picture is output later and will be stored in the DPB (as specified further below) and is output at time $t_{o,dpb}(n)$ unless indicated not to be output by the decoding or inference of no_output_of_prior_pics_flag equal to 1 at a time that precedes $t_{o,dpb}(n)$.

When output, the current or selected picture may be cropped, using a cropping rectangle specified in the active sequence parameter set, thereby generating a cropped picture based on the selected picture, i.e., the current picture. When picture n is a picture that is output and is not the last picture of the bitstream that is output, the value of $\Delta t_{o,dpb}(n)$ is defined as:

$$\Delta t_{o,dpb}(n) = t_{o,dpb}(n_n) - t_{o,dpb}(n) \quad (C-13)$$

where $n_n$ indicates the picture that follows after picture n in output order and has PicOutputFlag equal to 1. Further details of a bumping process and a cropping process are provided further below.

Some examples involving current decoded picture marking and storage are described as follows. The following may happen instantaneously at the CPB removal time of the last decoding unit of access unit n (containing the current picture), $t_r(m)$. The current decoded picture may be stored in the DPB in an empty picture storage buffer, and the DPB fullness may be incremented by one. If the current picture is a reference picture, it may be marked as "used for reference", otherwise it may be marked as "unused for reference."

The following example syntax and semantics for signaling of CPB behavior mode are provided with respect to an example video encoder 20 and/or video decoder 30 configured to store one or more decoding units of video data in a picture buffer, obtain a respective buffer removal time for the one or more decoding units, remove the decoding units from the picture buffer in accordance with the obtained buffer removal time for each of the decoding units, and code video data corresponding to the removed decoding units, among other functions.

Some examples of syntax and semantics for signaling of CPB behavior mode are described as follows. The syntax of video usability information (VUI) parameters may be changed by adding a sub-picture CPB flag, sub_pic_cpb_flag, as shown in Table 1 below:

TABLE 1

| vui_parameters( ) { | Descriptor |
|---|---|
| ... | |
| timing_info_present_flag | u(1) |
| if( timing_info_present_flag ) { | |
|   num_units_in_tick | u(32) |
|   time_scale | u(32) |
|   fixed_pic_rate_flag | u(1) |
| } | |
| nal_hrd_parameters_present_flag | u(1) |
| if( nal_hrd_parameters_present_flag ) | |
|   hrd_parameters( ) | |
| vcl_hrd_parameters_present_flag | u(1) |
| if( vcl_hrd_parameters_present_flag ) | |
|   hrd_parameters( ) | |
| if( nal_hrd_parameters_present_flag \|\| | |
|   vcl_hrd_parameters_present_flag ) { | |
|   sub_pic_cpb_flag | u(1) |
|   low_delay_hrd_flag | u(1) |
| } | |
| ... | |
| } | |

In this example, Table 1 includes an added flag "sub_pic_cpb_flag," relative to conventional HEVC. This sub-picture CPB flag, "sub_pic_cpb_flag," may be used to signal whether or not a set of video data provided to the coding picture buffer (CPB) includes sub-picture parameters for sub-picture decoding. Such sub-picture parameters that the flag "sub_pic_cpb_flag" may signal the presence of may include buffer removal times, including respective buffer removal times (i.e., CPB removal times) for each of one or more decoding units. One example of the semantics of sub_pic_cpb_flag is as follows. The syntax element sub_pic_cpb_flag being equal to 0 may specify that the CPB operates at access unit level. The syntax element sub_pic_cpb_flag being equal to 1 may specify that the CPB operates at a decoding unit level which may be at the level of access units or of subsets of access units, which may correspond to sub-pictures. When sub_pic_cpb_flag is not present, its value may be set to inferred to be equal to 0, which may indicate a default state in which the video data does not include sub-picture parameters for sub-picture decoding.

Some examples of syntax and semantics for signaling of CPB removal times of decoding units are described as follows. The syntax of buffering period SEI message may remain unchanged as in HEVC WD6, while the semantics of the syntax elements initial_cpb_removal_delay[SchedSelIdx] and initial_cpb_removal_delay_offset[SchedSelIdx] may be changed as follows. In this example, the syntax element initial_cpb_removal_delay[SchedSelIdx] may specify the delay for the SchedSelIdx-th CPB between the time of arrival in the CPB of the first bit of the coded data associated with the first decoding unit in the access unit associated with the buffering period SEI message and the time of removal from the CPB of the coded data associated with the same decoding unit, for the first buffering period after HRD initialization. This syntax element may have a length in bits given by initial_cpb_removal_delay_length_minus1+1. This may refer to units of a 90 kHz clock. In this example, this syntax element initial_cpb_removal_delay[SchedSelIdx] may not be equal to 0 and may not exceed 90000*(CpbSize[SchedSelIdx] BitRate[SchedSelIdx]), the time-equivalent of the CPB size in 90 kHz clock units.

In this example, the syntax element initial_cpb_removal_delay_offset[SchedSelIdx] may be used for the SchedSelIdx-th CPB in combination with the syntax element cpb_removal_delay to specify the initial delivery time of decoding units to the CPB. Furthermore, the syntax element initial_cpb_removal_delay_offset[SchedSelIdx] may be in units of a 90 kHz clock. The initial_cpb_removal_delay_offset[SchedSelIdx] syntax element may be a fixed length code whose length in bits is given by initial_cpb_removal_delay_length_minus1+1. This syntax element may not be used by decoders and may be needed only for the delivery scheduler (HSS) specified in Annex C of HEVC WD6.

In some examples, the syntax and semantics of picture timing SEI message may be changed as shown in Table 2 below:

TABLE 2

| pic_timing( payloadSize ) { | Descriptor |
|---|---|
| if( CpbDpbDelaysPresentFlag ) { | |
|   if( sub_pic_cpb_flag ) | |
|     num_decoding_units_minus1 | ue(v) |
|   for( i = 0; i <= num_decoding_units_minus1; i++ ) | |
|     cpb_removal_delay[ i ] | u(v) |
|     dpb_output_delay | u(v) |
| } | |
| } | |

In the example of Table 2, the pic_timing SEI message includes an added num_decoding_units_minus1 signal, and a for loop over the number of decoding units, which signals a respective removal delay of a decoding unit from the coded picture buffer, when the sub_pic_cpb_flag of the VUI parameters, e.g., according to Table 1 above, is true. In this manner, the pic_timing SEI message may include information indicating a number of clock ticks to wait until removing each of a plurality of decoding units from the coded picture buffer when the VUI parameters indicate that the CPB operates at the decoding unit level. The removal delay of a decoding unit may be the same delay for each decoding unit in a payload or other unit of data. In other examples, different removal delays may be applied to different decoding units. The removal delay may be expressed in terms of a number of bits, with an implicit time conversion of the number of bits with respect to the bit processing rate for the applicable clock.

The syntax of the picture timing SEI message may be dependent on the content of the sequence parameter set that is active for the coded picture associated with the picture timing SEI message. However, unless the picture timing SEI message of an instantaneous decoding refresh (IDR) access unit is preceded by a buffering period SEI message within the same access unit, the activation of the associated sequence parameter set (and, for IDR pictures that are not the first picture in the bitstream, the determination that the coded picture is an IDR picture) may not occur until the decoding of the first coded slice Network Abstraction Layer (NAL) unit of the coded picture. Since the coded slice NAL unit of the coded picture follows the picture timing SEI message in NAL unit order, there may be cases in which it is necessary for a decoder to store the raw byte sequence payload (RBSP) containing the picture timing SEI message until determining the parameters of the sequence parameter set that will be active for the coded picture, and then perform the parsing of the picture timing SEI message. The decoder may store one or more decoding units of video data in a continuous decoding order in the picture buffer.

The presence of picture timing SEI message in the bitstream may be specified in one example as follows: if CpbDpbDelaysPresentFlag is equal to 1, one picture timing SEI message may be present in every access unit of the coded video sequence. Otherwise CpbDpbDelaysPresentFlag is equal to 0, and no picture timing SEI messages may be present in any access unit of the coded video sequence.

In this example, the syntax element num_decoding_units_minus1 plus 1 may specify the number of decoding units in the access unit the picture timing SEI message is associated with. When sub_pic_cpb_flag is equal to 0, the syntax element num_decoding_units_minus1 may not be present and the value may be set to or inferred to be 0.

In this example, the syntax element cpb_removal_delay[i] may specify how many clock ticks to wait after removal from the CPB of the first decoding unit in the access unit associated with the most recent buffering period SEI message in a preceding access unit before removing from the CPB the i-th decoding unit in the access unit associated with the picture timing SEI message. This value may also be used to calculate an earliest possible time of arrival of decoding unit data into the CPB for the HSS. The syntax element may be a fixed length code whose length in bits is given by cpb_removal_delay_length_minus1+1. The cpb_removal_delay[i] may be the remainder of a modulo $2^{(cpb\_removal\_delay\_length\_minus1+1)}$ counter.

The value of cpb_removal_delay_length_minus1 that determines the length (in bits) of the syntax element cpb_removal_delay[i] may be the value of cpb_removal_delay_length_minus1 coded in the sequence parameter set that is active for the coded picture associated with the picture timing SEI message. However, cpb_removal_delay[i] may specify a number of clock ticks relative to the removal time of the first decoding unit in the preceding access unit containing a buffering period SEI message, which may be an access unit of a different coded video sequence.

In this example, the syntax element dpb_output_delay may be used to compute the DPB output time of the picture. The syntax element dpb_output_delay may specify how many clock ticks to wait after removal of the last decoding unit in an access unit from the CPB before the decoded picture is output from the DPB.

A picture may not be removed from the DPB at its output time when it is still marked as "used for short-term reference" or "used for long-term reference". Only one dpb_output_delay may be specified for a decoded picture. The length of the syntax element dpb_output_delay may be given in bits by dpb_output_delay_length_minus1+1. When max_dec_pic_buffering[max_temporal_layers_minus1] is equal to 0, dpb_output_delay may be equal to 0.

The output time derived from the dpb_output_delay of any picture that is output from an output timing conforming decoder may precede the output time derived from the dpb_output_delay of all pictures in any subsequent coded video sequence in decoding order. The picture output order established by the values of this syntax element may be the same order as established by the values of PicOrderCnt( ). For pictures that are not output by the "bumping" process because they precede, in decoding order, an IDR picture with no_output_of_prior_pics_flag equal to 1 or inferred to be equal to 1, the output times derived from dpb_output_delay may be increasing with increasing value of PicOrderCnt( ) relative to all pictures within the same coded video sequence. In an alternative example, a new SEI message, that may be called a decoding unit timing SEI message, each associated with a decoding unit, may be specified, to convey the CPB removal delay for the associated decoding unit.

In this manner by implementing any combination of the example definitions, example HRD operation, example operation of a coded picture buffer, example timing of a bitstream arrival, example timing of decoding unit removal, example decoding of a decoding unit, example operation of a decoded picture buffer, example removal of pictures from a decoded picture buffer, example picture output, and example current decoded picture marking and storage, and example syntax and semantics for signaling of CPB behavior mode, video encoder 20 and/or video decoder 30 may be configured to store one or more decoding units of video data in a picture buffer, obtain a respective buffer removal time for the one or more decoding units, remove the decoding units from the picture buffer in accordance with the obtained buffer removal time for each of the decoding units, and code video data corresponding to the removed decoding units, among other functions.

As an alternative to the techniques described above, a decoding unit may be defined as follows: "An access unit or a subset of an access unit. If SubPicCpbFlag is equal to 0, a decoding unit is an access unit. Otherwise, a decoding unit includes one or more VCL NAL units and the associated non-VCL NAL units in an access unit. For the first VCL NAL unit in an access unit, the associated non-VCL NAL units are all non-VCL NAL units in the access unit and before the first VCL NAL unit and the filler data NAL units, if any, immediately following the first non-VCL NAL unit. For a VCL NAL unit that is not the first VCL NAL unit in an access unit, the associated non-VCL NAL units are the filler data NAL units, if any, immediately following the non-VCL NAL unit."

In this example, the hypothetical reference decoder (HRD) operations may be summarized as follows. The CPB size (number of bits) is CpbSize[SchedSelIdx]. The DPB size (number of picture storage buffers) for temporal layer X may be max_dec_pic_buffering[X]+1 for each X in the range of 0 to max_temporal_layers_minus1, inclusive. A variable SubPicCpbPreferredFlag may be used as a sub-picture coded picture buffer preferred flag, and may either be specified by external means, or when not specified by external means, set to 0. A separate sub-picture coded picture parameters present flag, sub_pic_cpb_params_present_flag, may be used to signal whether the parameters needed for coding subsets of one or more access units are available. A single sub-picture coded picture buffer flag, SubPicCpbFlag, may indicate whether both the sub-picture coded picture buffer preferred flag and the sub-picture coded picture parameters present flag are positive, or set to 1. A video coder may use this sub-picture coded picture buffer flag, SubPicCpbFlag, to determine whether to code access units of video data or to code subsets of one or more access units, such as sub-pictures, of video data, as the video data is removed from the CPB.

The variable SubPicCpbFlag may be derived as follows:

$$\text{SubPicCpbFlag=SubPicCpbPreferredFlag \&\& sub\_pic\_cpb\_params\_present\_flag} \quad \text{(C-1)}$$

If SubPicCpbFlag is equal to 0, the CPB may operate at access unit level, and each decoding unit may be an access unit. Otherwise, the CPB may operate at sub-picture level, and each decoding unit may be a subset of an access unit.

Video decoder 30/108 may determine that the one or more decoding units comprise access units by determining that a sub-picture coded picture buffer preferred flag (e.g., SubPicCpbPreferredFlag,) has a value of zero or that a sub-picture coded picture buffer parameters present flag (e.g., sub_pic_cpb_params_present_flag) has a value of zero.

The HRD (e.g., video encoder 20 and/or video decoder 30) may operate as follows. Data associated with decoding units that flow into the CPB according to a specified arrival schedule may be delivered by the HSS. In one example, the data associated with each decoding unit may be removed and decoded instantaneously by the instantaneous decoding process at CPB removal times. Each decoded picture may be placed in the DPB. A decoded picture may be removed from the DPB at the latter of the DPB output time or the time that it becomes no longer needed for inter-prediction reference.

Arithmetic operations described in this disclosure may be done with real values, so that no rounding errors are propagated. For example, the number of bits in a CPB just prior to or after removal of a decoding unit may not necessarily be an integer.

The variable $t_c$ may be derived as follows and called a clock tick:

$$t_c = \text{num\_units\_in\_tick} \div \text{time\_scale} \quad \text{(C-1)}$$

The following may be specified for expressing the constraints in this example of the techniques of this disclosure:
- let access unit n be the n-th access unit in decoding order with the first access unit being access unit 0;
- let picture n be the coded picture or the decoded picture of access unit n;
- let decoding unit m be the m-th decoding unit in decoding order with the first decoding unit being decoding unit 0.

Operations of the coded picture buffer (CPB) may be defined as follows. The specifications in this example may apply independently to each set of CPB parameters that is present and to both the Type I and Type II conformance points.

With respect to timing of bitstream arrival, the HRD may be initialized at any one of the buffering period SEI messages. Prior to initialization, the CPB may be empty. After initialization, the HRD may not be initialized again by subsequent buffering period SEI messages.

Each access unit may be referred to as a respective access unit n, where the number n identifies the particular access unit. The access unit that is associated with the buffering period SEI message that initializes the CPB may be referred to as access unit 0. The value of n may be incremented by 1 for each subsequent access unit in decoding order.

Each decoding unit may be referred to respectively as decoding unit m, where the number m identifies the particular decoding unit. The first decoding unit in decoding order in access unit 0 may be referred to as decoding unit 0. The value of m may be incremented by 1 for each subsequent decoding unit in decoding order.

In this example, if the variable SubPicCpbFlag is equal to 0, the variable InitCpbRemovalDelay[SchedSelIdx] may be set to initial_cpb_removal_delay[SchedSelIdx] of the associated buffering period SEI message, and InitCpbRemovalDelayOffset[SchedSelIdx] may be set to initial_cpb_removal_delay_offset[SchedSelIdx] of the associated buffering period SEI message. Otherwise, the variable InitCpbRemovalDelay[SchedSelIdx] may be set to initial_du_cpb_removal_delay[SchedSelIdx] of the associated buffering period SEI message, and InitCpbRemovalDelayOffset[SchedSelIdx] may be set to initial_du_cpb_removal_delay_offset[SchedSelIdx] of the associated buffering period SEI message.

The time at which the first bit of decoding unit n begins to enter the CPB may be referred to as the initial arrival time $t_{ai}(m)$. The initial arrival time of decoding units may be derived as follows:

if the decoding unit is decoding unit 0, $t_{ai}(0)=0$;

otherwise (the decoding unit is decoding unit m with m>0), the following may apply:

if cbr_flag[SchedSelIdx] is equal to 1, the initial arrival time for decoding unit m, may be equal to the final arrival time (which is derived below) of access unit m−1, i.e., $$t_{ai}(m)=t_{af}(m-1) \quad (C-2)$$

otherwise (cbr_flag[SchedSelIdx] is equal to 0), the initial arrival time for decoding unit m may be derived by $$t_{ai}(m)=\text{Max}(t_{af}(m-1), t_{ai,earliest}(m)) \quad (C-3)$$

where $t_{ai,earliest}(m)$ may be derived as follows:
if decoding unit n is not the first decoding unit of a subsequent buffering period, $t_{ai,earliest}(m)$ may be derived as:

$$t_{ai,earliest}(m)=t_{r,n}(m)-(\text{InitCpbRemovalDelay[Sched-} \\ \text{SelIdx]+InitCpbRemovalDelayOffset[Sched-} \\ \text{SelIdx])}\div 90000 \quad (C-4)$$

with $t_{r,n}(m)$ being the nominal removal time of decoding unit m from the CPB;

otherwise (decoding unit m is the first decoding unit of a subsequent buffering period), $t_{ai,earliest}(m)$ may be derived as $$t_{ai,earliest}(m)=t_{r,n}(m)-(\text{InitCpbRemovalDelay[Sched-} \\ \text{SelIdx]}\div 90000) \quad (C-5)$$

The final arrival time $t_{af}$ for decoding unit m may be derived by $$t_{af}(m)=t_{ai}(m)+b(m)\ \text{BitRate[SchedSelIdx]} \quad (C-6)$$

where b(m) is the size in bits of decoding unit m, counting the bits of the VCL NAL units and the filler data NAL units for the Type I conformance point or all bits of the Type II bitstream for the Type II conformance point.

In some examples, the values of SchedSelIdx, BitRate[SchedSelIdx], and CpbSize[SchedSelIdx] may be constrained as follows:

if the content of the active sequence parameter sets for the access unit containing decoding unit m and the previous access unit differ, the HSS may select a value SchedSelIdx1 of SchedSelIdx from among the values of SchedSelIdx provided in the active sequence parameter set for the access unit containing decoding unit m that results in a BitRate[SchedSelIdx1] or CpbSize[SchedSelIdx1] for the access unit containing decoding unit m. The value of BitRate[SchedSelIdx1] or CpbSize[SchedSelIdx1] may differ from the value of BitRate[SchedSelIdx0] or CpbSize[SchedSelIdx0] for the value SchedSelIdx0 of SchedSelIdx that was in use for the previous access unit; otherwise, the HSS may continue to operate with the previous values of SchedSelIdx, BitRate[SchedSelIdx] and CpbSize[SchedSelIdx].

When the HSS selects values of BitRate[SchedSelIdx] or CpbSize[SchedSelIdx] that differ from those of the previous access unit, the following may apply:

the variable BitRate[SchedSelIdx] may come into effect at time $t_{ai}(m)$;

the variable CpbSize[SchedSelIdx] may come into effect as follows:

if the new value of CpbSize[SchedSelIdx] exceeds the old CPB size, it may come into effect at time $t_{ai}(m)$;

otherwise, the new value of CpbSize[SchedSelIdx] may come into effect at the CPB removal time of the last decoding unit of the access unit containing decoding unit m.

When the variable SubPicCpbFlag is equal to 1, the initial CPB arrival time of access unit n $t_{ai}(n)$ may be set to the initial CPB arrival time of the first decoding unit in access unit n, and the final CPB arrival time of access unit n $t_{af}(n)$ may be set to the final CPB arrival time of the last decoding unit in access unit n. When SubPicCpbFlag is equal to 0, each decoding unit may be an access unit, such that the initial and final CPB arrival times of access unit n may be the initial and final CPB arrival times of decoding unit m.

The following discussion provides an example for the timing of decoding unit removal and decoding of a decoding unit. If SubPicCpbFlag is equal to 0, the variable CpbRemovalDelay(m) may be set to the value of cpb_removal_delay specified in the picture timing SEI message associated with the access unit that is decoding unit m. Otherwise, the variable CpbRemovalDelay(m) may be set to the value of du_cpb_removal_delay[i] for decoding unit m specified in the picture timing SEI message associated with the access unit that contains decoding unit m.

When a decoding unit m is the decoding unit with m equal to 0 (the first decoding unit of the access unit that initializes the HRD), the nominal removal time of the decoding unit from the CPB may be specified by:

$$t_{r,n}(0)=\text{InitCpbRemovalDelay[SchedSelIdx]}\div 90000 \quad (C-7)$$

When a decoding unit m is the first decoding unit of the first access unit of a buffering period that does not initialize the HRD, the nominal removal time of the decoding unit from the CPB may be specified by $$t_{r,n}(m)=t_{r,n}(m_b)+t_c*\text{CpbRemovalDelay}(m) \quad (C-8)$$

where $t_{r,n}(m_b)$ is the nominal removal time of the first decoding unit of the previous buffering period.

When a decoding unit m is the first decoding unit of a buffering period, $m_b$ may be set equal to m at the removal time $t_{r,n}(m)$ of the decoding unit m.

The nominal removal time $t_{r,n}(m)$ of a decoding unit m that is not the first decoding unit of a buffering period may be given by:

$$t_{r,n}(m) = t_{r,n}(m_b) + t_c * \text{CpbRemovalDelay}(m) \quad \text{(C-9)}$$

where $t_{r,n}(m_b)$ is the nominal removal time of the first decoding unit of the current buffering period.

The removal time of decoding unit m may be specified as follows:

If low_delay_hrd_flag is equal to 0 or $t_{r,n}(m) >= t_{af}(m)$, the removal time of decoding unit m may be specified by:

$$t_r(m) = t_{r,n}(m) \quad \text{(C-10)}$$

Otherwise (low_delay_hrd_flag is equal to 1 and tr,n(m) <taf(m)), and the removal time of decoding unit m may be specified by:

$$t_r(m) = t_{r,n}(m) + t_c * \text{Ceil}((t_{af}(m) - t_{r,n}(m)) \div t_c) \quad \text{(C-11)}$$

The latter case, in this example, indicates that the size of decoding unit m, b(m), is so large that it prevents removal at the nominal removal time.

When SubPicCpbFlag is equal to 1, the nominal CPB removal time of access unit n, $t_{r,n}(n)$, may be set to the normal CPB removal time of the last decoding unit in access unit n; the CPB removal time of access unit n, $t_r(n)$, may be set to the CPB removal time of the last decoding unit in access unit n. When SubPicCpbFlag is equal to 0, each decoding unit m is an access unit n, in this example, and hence, the nominal CPB removal time and the CPB removal time of access unit n are the nominal CPB removal time and the CPB removal time of decoding unit m. At CPB removal time of decoding unit m, in some examples, the decoding unit may be instantaneously decoded.

In this example, the decoded picture buffer (DPB) may operate as follows. The decoded picture buffer may contain one or more picture storage buffers. Each of the picture storage buffers may contain a decoded picture that is marked as "used for reference" or is held for future output. Prior to initialization, the DPB may be empty (the DPB fullness variable may be set to zero). The following steps of this example may happen in the sequence listed.

First, pictures may be removed from the DPB. The removal of pictures from the DPB before decoding of the current picture (but after parsing the slice header of the first slice of the current picture) may happen instantaneously at the CPB removal time of the first decoding unit of access unit n (containing the current picture) and may proceed as follows. The decoding process for reference picture set as specified in subclause 8.3.2 of HEVC WD6 may be invoked. If the current picture is an IDR picture, the following may apply: when the IDR picture is not the first IDR picture decoded and the value of pic_width_in_luma_samples or pic_height_in_luma_samples or max_dec_pic_buffering derived from the active sequence parameter set is different from the value of pic_width_in_luma_samples or pic_height_in_luma_samples or max_dec_pic_buffering derived from the sequence parameter set that was active for the preceding picture, respectively, no_output_of_prior_pics_flag (i.e., a no output of prior pictures flag) may be inferred to be equal to 1 by the HRD, or set to 1 for its own processing by the HRD, regardless of the actual value of no_output_of_prior_pics_flag. Decoder implementations may try to handle picture or DPB size changes more gracefully than the HRD in regard to changes in pic_width_in_luma_samples or pic_height_in_luma_samples.

When no_output_of_prior_pics_flag is equal to 1 or is inferred to be equal to 1, all picture storage buffers in the DPB may be emptied without output of the pictures they contain, and DPB fullness may be set to 0. (Further processing that may be performed if no_output_of_prior_pics_flag has a value that is not equal to 1 is described further below.) All pictures k in the DPB, for which of the following conditions are true, may be removed from the DPB:

picture k is marked as "unused for reference";
picture k has PicOutputFlag equal to 0 or its DPB output time is less than or equal to the CPB removal time of the first decoding unit (denoted as decoding unit m) of current picture n; i.e., $t_{o,dpb}(k) <= t_r(m)$.

When a picture is removed from the DPB, the DPB fullness may be decremented by one. For picture output, the following may happen instantaneously at the CPB removal time of access unit n, tr(n):

Picture n may be considered as decoded after the last decoding unit of the picture is decoded.

When picture n has PicOutputFlag equal to 1, its DPB output time to,dpb(n) may be derived by:

$$t_{o,dpb}(n) = t_r(n) + t_c * \text{dpb\_output\_delay}(n) \quad \text{(C-12)}$$

where dpb_output_delay(n) is the value of dpb_output_delay specified in the picture timing SEI message associated with access unit n.

The output of the current picture may be specified as follows:

if PicOutputFlag is equal to 1 and to,dpb(n)=tr(n), the current picture may be output;

otherwise, if PicOutputFlag is equal to 0, the current picture may not be output, but may be stored in the DPB;

otherwise (PicOutputFlag is equal to 1 and $t_{o,dpb}(n) > tr(n)$), the current picture may be output later and may be stored in the DPB (as specified in subclause C.3.3 of HEVC WD6 as modified by this disclosure), and may be output at time $t_{o,dpb}(n)$ unless indicated not to be output by the decoding or inference of no_output_of_prior_pics_flag equal to 1 at a time that precedes $t_{o,dpb}(n)$. In other words, the current picture may be stored in the DPB and may be output later, e.g., at time $t_{o,dpb}(n)$, if the no output of prior pictures flag is not equal to 1.

When output, the picture may be cropped, using the cropping rectangle specified in the active sequence parameter set.

When picture n is a picture that is output and is not the last picture of the bitstream that is output, the value of a DPB output time interval Δto,dpb(n) may be defined as follows:

$$\Delta t_{o,dpb}(n) = t_{o,dpb}(n_n) - t_{o,dpb}(n) \quad \text{(C-13)}$$

where $n_n$ may indicate the picture that follows after picture n in output order and has PicOutputFlag equal to 1, such that the DPB output time interval Δto,dpb(n) may be defined as the difference between the DPB output time of a subsequent picture after picture n in output order and the DPB output time of picture n.

For current decoded picture marking and storage, the following may be implemented instantaneously at the CPB removal time of access unit n, tr(n): the current decoded picture may be stored in the DPB in an empty picture storage buffer, and the DPB fullness may be incremented by one; if the current picture is a reference picture, it may be marked as "used for reference", otherwise it may be marked as "unused for reference."

For operation of output order of the DPB, the decoded picture buffer may contain one or more picture storage buffers. Each of the picture storage buffers may contain a decoded picture that is marked as "used for reference" or is held for future output. At HRD initialization, the DPB may be empty. The following steps may happen in the order listed.

Pictures may be removed from the DPB as follows. The removal of pictures from the DPB before decoding of the current picture (but after parsing the slice header of the first slice of the current picture) may be implemented instantaneously when the first decoding unit of the access unit containing the current picture is removed from the CPB and may proceed as follows.

The decoding process for reference picture set as specified in subclause 8.3.4.3 of HEVC WD6, as modified according to this disclosure, may be invoked (as partially described above, and as further described as follows).

If the current picture is an IDR picture, the following may apply:

when the IDR picture is not the first IDR picture decoded and the value of pic_width_in_luma_samples or pic_height_in_luma_samples or max_dec_pic_buffering derived from the active sequence parameter set is different from the value of pic_width_in_luma_samples or pic_height_in_luma_samples or max_dec_pic_buffering derived from the sequence parameter set that was active for the preceding picture, respectively, no_output_of_prior_pics_flag may be set to or inferred to be equal to 1 by the HRD, regardless of the actual value of no_output_of_prior_pics_flag. Decoder implementations may try to handle changes in the value of pic_width_in_luma_samples or pic_height_in_luma_samples or max_dec_pic_buffering more gracefully than the HRD;

when no_output_of_prior_pics_flag is equal to 1 or is inferred to be equal to 1, all picture storage buffers in the DPB may be emptied without output of the pictures they contain;

otherwise, picture storage buffers containing a picture which are marked as "not needed for output" and "unused for reference" may be emptied (without output).

When any of the following conditions is true, a "bumping" process specified in subclause C.5.2.1 of HEVC WD6 as modified by this disclosure may be invoked repeatedly until there is an empty picture storage buffer to store the current decoded picture:

the number of pictures in the DPB that are marked as "needed for output" is greater than a number of reorder pictures at a current temporal layer, i.e., num_reorder_pics [temporal_id]; or, the number of pictures in the DPB with number of pictures in the DPB with temporal layer identifier values, temporal_id, lower than or equal to a temporal layer identifier value, temporal_id, of the current picture is equal to a maximum picture buffering value of the current temporal layer plus one, i.e., max_dec_pic_buffering[temporal_id]+1; or, when the current picture is an IDR picture for which the no output of prior pictures flag, no_output_of_prior_pics_flag, has a value not equal to 1 and not inferred to be equal to 1.

The following steps may be performed: picture storage buffers containing a picture that are marked as "not needed for output" and "unused for reference" may be emptied (without output); and all non-empty picture storage buffers in the DPB may be emptied by repeatedly invoking the "bumping" process specified below.

Therefore, a "bumping" process may be invoked in any of the following cases:

the current picture is an IDR picture and no_output_of_prior_pics_flag is not equal to 1 and is not set to or inferred to be equal to 1, as specified in subclause C.5.2 of HEVC WD6 as modified by this disclosure; or, the number of pictures in the DPB that are marked "needed for output" is greater than a number of reorder pictures at a current temporal layer, i.e., num_reorder_pics[temporal_id], as specified in subclause C.5.2 of HEVC WD6 as modified by this disclosure; or, the number of pictures in the DPB with temporal_id lower than or equal to a temporal layer identifier value, temporal_id, of the current picture is equal to a maximum picture buffering value of the current temporal layer plus one, i.e., max_dec_pic_buffering[temporal_id]+1, as specified in subclause C.5.2 of HEVC WD6 as modified by this disclosure.

The "bumping" process may include the following ordered steps:

1. The picture that is first for output may be selected as the one having the smallest value of PicOrderCntVal of all pictures in the DPB marked as "needed for output".
2. The picture is cropped, using the cropping rectangle specified in the active sequence parameter set for the picture, the cropped picture may be output, and the picture may be marked as "not needed for output".
3. If the picture storage buffer that included the picture that was cropped and output contains a picture marked as "unused for reference", the picture storage buffer may be emptied.

The following may happen instantaneously for picture decoding, marking, and storage, when the last decoding unit of access unit n containing the current picture is removed from the CPB.

The current picture may be considered as decoded after the last decoding unit of the picture is decoded. The current decoded picture may be stored in an empty picture storage buffer in the DPB, and the following may apply:

if the current decoded picture has PicOutputFlag equal to 1, it may be marked as "needed for output";

otherwise (the current decoded picture has PicOutputFlag equal to 0), it may be marked as "not needed for output".

If the current decoded picture is a reference picture, it may be marked as "used for reference;" otherwise (the current decoded picture is a non-reference picture), it may be marked as "unused for reference".

Therefore, a bumping process may include: selecting a picture having a smallest picture order count (POC) value of pictures in the DPB and that is marked as needed for output as a selected picture; cropping the selected picture as specified in an active sequence parameter set for the selected picture, thereby generating a cropped picture based on the selected picture; outputting the cropped picture; and marking the selected picture as not needed for output.

Syntax elements may be used to signal a CPB behavior mode, using the semantics defined below. The syntax of VUI parameters and semantics may be changed to be as shown in Table 3 below (semantics of existing syntax elements are not changed relative to HEVC WD6, in this example):

TABLE 3

| vui_parameters( ) { | Descriptor |
|---|---|
| aspect_ratio_info_present_flag | u(1) |
| if( aspect_ratio_info_present_flag ) { | |
| aspect_ratio_idc | u(8) |
| if( aspect_ratio_idc = = Extended_SAR ) { | |
| sar_width | u(16) |
| sar_height | u(16) |
| } | |
| } | |
| overscan_info_present_flag | u(1) |
| if( overscan_info_present_flag ) | |
| overscan_appropriate_flag | u(1) |
| video_signal_type_present_flag | u(1) |
| if( video_signal_type_present_flag ) { | |
| video_format | u(3) |
| video_full_range_flag | u(1) |
| colour_description_present_flag | u(1) |
| if( colour_description_present_flag ) { | |
| colour_primaries | u(8) |
| transfer_characteristics | u(8) |
| matrix_coefficients | u(8) |
| } | |
| } | |
| chroma_loc_info_present_flag | u(1) |
| if( chroma_loc_info_present_flag ) { | |
| chroma_sample_loc_type_top_field | ue(v) |
| chroma_sample_loc_type_bottom_field | ue(v) |
| } | |
| neutral_chroma_indication_flag | u(1) |
| field_indication_presence_flag | u(1) |
| timing_info_present_flag | u(1) |
| if( timing_info_present_flag ) { | |
| num_units_in_tick | u(32) |
| time_scale | u(32) |
| fixed_pic_rate_flag | u(1) |
| } | |
| nal_hrd_parameters_present_flag | u(1) |
| if( nal_hrd_parameters_present_flag ) | |
| hrd_parameters( ) | |
| vcl_hrd_parameters_present_flag | u(1) |
| if( vcl_hrd_parameters_present_flag ) | |
| hrd_parameters( ) | |
| if( nal_hrd_parameters_present_flag \|\| | |
| vcl_hrd_parameters_present_flag ) { | |
| sub_pic_cpb_params_present_flag | u(1) |
| low_delay_hrd_flag | u(1) |
| } | |
| bitstream_restriction_flag | u(1) |
| if( bitstream_restriction_flag) { | |
| motion_vectors_over_pic_boundaries_flag | u(1) |
| max_bytes_per_pic_denom | ue(v) |
| max_bits_per_mincu_denom | ue(v) |
| log2_max_mv_length_horizontal | ue(v) |
| log2_max_mv_length_vertical | ue(v) |
| } | |
| } | |

In the example of Table 3, the VUI parameters include an added flag sub_pic_cpb_params_present_flag, relative to conventional HEVC. The semantics for this flag may be defined as follows: sub_pic_cpb_params_present_flag being equal to 1 may specify that sub-picture level CPB removal delay parameters are present and the CPB may operate at access unit level or sub-picture level. The variable sub_pic_cpb_flag being equal to 0 may specify that sub-picture level CPB removal delay parameters are not present and the CPB has to operate at access unit level. When sub_pic_cpb_params_present_flag is not present, its value may be set to or inferred to be equal to 0.

Syntax elements may also be used to signal CPB removal times of decoding units, using the semantics described below. In this example, the syntax elements may be signaled in a buffering period SEI message, e.g., in accordance with the example of Table 4:

TABLE 4

| buffering_period( payloadSize ) { | Descriptor |
|---|---|
| seq_parameter_set_id | ue(v) |
| if( NalHrdBpPresentFlag ) { | |
| for( SchedSelIdx = 0; SchedSelIdx <= cpb_cnt_minus1; SchedSelIdx++ ) { | |
| initial_cpb_removal_delay[ SchedSelIdx ] | u(v) |
| initial_cpb_removal_delay_offset[ SchedSelIdx ] | u(v) |
| if( sub_pic_cpb_flag ) { | |
| initial_du_cpb_removal_delay[ SchedSelIdx ] | u(v) |
| initial_du_cpb_removal_delay_offset[ SchedSelIdx ] | u(v) |
| } | |
| } | |
| } | |
| if( VclHrdBpPresentFlag ) { | |
| for( SchedSelIdx = 0; SchedSelIdx <= cpb_cnt_minus1; SchedSelIdx++ ) { | |
| initial_cpb_removal_delay[ SchedSelIdx ] | u(v) |
| initial_cpb_removal_delay_offset[ SchedSelIdx ] | u(v) |
| if( sub_pic_cpb_flag ) { | |
| initial_du_cpb_removal_delay[ SchedSelIdx ] | u(v) |
| initial_du_cpb_removal_delay_offset[ SchedSelIdx ] | u(v) |
| } | |
| } | |
| } | |
| } | |

In the example of Table 4, the buffering period SEI message includes an added conditional relative to conventional HEVC, which further includes, when sub_pic_cpb_flag is true, two syntax elements are added, initial_du_cpb_removal_delay [SchedSelIdx] and initial_du_cpb_removal_delay_offset [SchedSelIdx]. This conditional and added syntax elements may be added within either or both of the conditionals for when NalHrdBpPresentFlag is true and/or when VclHardBpPresentFlag is true.

Table 5 provides an alternative example in which a different SEI message is defined to signal the initial CPB removal delay and initial CPB removal delay offset for the sub-picture level CPB operation:

TABLE 5

| du_buffering_period( payloadSize ) { | Descriptor |
|---|---|
| seq_parameter_set_id | ue(v) |
| if( NalHrdBpPresentFlag ) { | |
| for( SchedSelIdx = 0; SchedSelIdx <= cpb_cnt_minus1; SchedSelIdx++ ) { | |
| initial_du_cpb_removal_delay[ SchedSelIdx ] | u(v) |
| initial_du_cpb_removal_delay_offset[ SchedSelIdx ] | u(v) |
| } | |
| } | |
| if( VclHrdBpPresentFlag ) { | |
| for( SchedSelIdx = 0; SchedSelIdx <= cpb_cnt_minus1; SchedSelIdx++ ) { | |
| initial_du_cpb_removal_delay[ SchedSelIdx ] | u(v) |
| initial_du_cpb_removal_delay_offset[ SchedSelIdx ] | u(v) |
| } | |
| } | |
| } | |

In the example of Table 4 above, when NalHrdBpPresentFlag or VclHrdBpPresentFlag are equal to 1, a buffering period SEI message can be associated with any access unit in the bitstream, and a buffering period SEI message may be associated with each IDR access unit, with each CRA access unit, and with each access unit associated with a recovery point SEI message. For some applications, the frequent presence of a buffering period SEI message may be desirable. In some examples, a buffering period may be specified as the set of access units between two instances of the buffering period SEI message in decoding order.

In the examples of Tables 4 and 5 above, the variable seq_parameter_set_id may specify the sequence parameter set that contains the sequence HRD attributes. The value of seq_parameter_set_id may be equal to the value of seq_parameter_set_id in the picture parameter set referenced by the primary coded picture associated with the buffering period SEI message. In some examples, the value of seq_parameter_set_id may be in the range of 0 to 31, inclusive.

In the example of Table 4 above, initial_cpb_removal_delay[SchedSelIdx] may specify the delay for the SchedSelIdx-th CPB between the time of arrival in the CPB of the first bit of the coded data associated with the access unit associated with the buffering period SEI message and the time of removal from the CPB of the coded data associated with the same access unit, for the first buffering period after HRD initialization. This syntax element may have a length in bits given by initial_cpb_removal_delay_length_minus1+1. It may be in units of a 90 kHz clock in this example. The syntax element initial_cpb_removal_delay[SchedSelIdx] may not be equal to 0, in this example, and may not exceed 90000*(CpbSize[SchedSelIdx] BitRate[SchedSelIdx]), the time-equivalent of the CPB size in 90 kHz clock units, in this example.

In the example of Table 4 above, the syntax element initial_cpb_removal_delay_offset[SchedSelIdx] may be used for the SchedSelIdx-th CPB in combination with the cpb_removal_delay to specify the initial delivery time of coded access units to the CPB. The syntax element initial_cpb_removal_delay_offset[SchedSelIdx] may be in units of a 90 kHz clock in this example. The initial_cpb_removal_delay_offset[SchedSelIdx] syntax element may be a fixed length code whose length in bits is given by initial_cpb_removal_delay_length_minus1+1. This syntax element may not be used by decoders and may be needed only for the delivery scheduler (HSS) specified in Annex C of HEVC WD6. Over the entire coded video sequence, the sum of initial_cpb_removal_delay[SchedSelIdx] and initial_cpb_removal_delay_offset[SchedSelIdx] may be constant for each value of SchedSelIdx.

In the examples of Tables 4 and 5 above, the syntax element initial_du_cpb_removal_delay[SchedSelIdx] may specify the delay for the SchedSelIdx-th CPB between the time of arrival in the CPB of the first bit of the coded data associated with the first decoding unit in the access unit associated with the buffering period SEI message, and the time of removal from the CPB of the coded data associated with the same decoding unit, for the first buffering period after HRD initialization. This syntax element may have a length in bits given by initial_cpb_removal_delay_length_minus1+1. This syntax element may be in units of a 90 kHz clock in this example. In this example, the syntax element initial_du_cpb_removal_delay[SchedSelIdx] may not be equal to 0 and may not exceed 90000*(CpbSize[SchedSelIdx] BitRate[SchedSelIdx]), the time-equivalent of the CPB size in 90 kHz clock units.

In the examples of Tables 4 and 5 above, the syntax element initial_du_cpb_removal_delay_offset[SchedSelIdx] may be used for the SchedSelIdx-th CPB in combination with the cpb_removal_delay to specify the initial delivery time of decoding units to the CPB. The syntax element initial_du_cpb_removal_delay_offset[SchedSelIdx] may be in units of a 90 kHz clock in this example. The initial_du_cpb_removal_delay_offset[SchedSelIdx] syntax element may be a fixed length code whose length in bits is given by initial_cpb_removal_delay_length_minus1+1. This syntax element may not be used by decoders and may be needed only for the delivery scheduler (HSS) specified in Annex C of HEVC WD6, in this example.

Over the entire coded video sequence, the sum of initial_du_cpb_removal_delay[SchedSelIdx] and initial_du_cpb_removal_delay_offset[SchedSelIdx] may be constant for each value of SchedSelIdx.

Table 6 below provides an example picture timing SEI message syntax:

TABLE 6

| pic_timing( payloadSize ) { | Descriptor |
|---|---|
| if( CpbDpbDelaysPresentFlag ) { | |
|   cpb_removal_delay | u(v) |
|   dpb_output_delay | u(v) |
|   if( sub_pic_cpb_flag ) { | |
|     num_decoding_units_minus1 | ue(v) |
|     for( i = 0; i <= num_decoding_units_minus1; i++ ) { | |
|       num_nalus_in_du_minus1[ i ] | ue(v) |
|       du_cpb_removal_delay[ i ] | u(v) |
|     } | |
|   } | |
| } | |
| } | |

In this example, the picture timing SEI message includes an added conditional statement for sub_pic_cpb_flag, which when true signals a num_decoding_units_minus1 syntax element and a for loop that signals, for each of the decoding units, a corresponding numb_nalus_in_du_minus1 and a du_cpb_removal_delay. Alternatively, the mapping of NAL units to each decoding unit may be signaled using other means, e.g., by including a decoding unit ID for each VCL NAL unit, e.g., in the NAL unit header, the slice header, or a new SEI message. The decoding ID for each non-VCL NAL unit may be the same as the associated VCL NAL unit.

The syntax of the picture timing SEI message in the example of Table 6 may be dependent on the content of the sequence parameter set that is active for the coded picture associated with the picture timing SEI message. However, unless the picture timing SEI message of an IDR access unit is preceded by a buffering period SEI message within the same access unit, the activation of the associated sequence parameter set (and, for IDR pictures that are not the first picture in the bitstream, the determination that the coded picture is an IDR picture) may not occur until the decoding of the first coded slice NAL unit of the coded picture. Since the coded slice NAL unit of the coded picture may follow the picture timing SEI message in NAL unit order, here may be cases in which it a decoder stores the RBSP containing the picture timing SEI message until determining the parameters of the sequence parameter that will be active for the coded picture, and then performs the parsing of the picture timing SEI message.

The presence of picture timing SEI message, per the example of Table 6, in the bitstream may be specified as follows.

if CpbDpbDelaysPresentFlag is equal to 1, one picture timing SEI message may be present in every access unit of the coded video sequence;

otherwise (CpbDpbDelaysPresentFlag is equal to 0), no picture timing SEI messages needs to be present in any access unit of the coded video sequence.

The variable cpb_removal_delay may specify how many clock ticks (see subclause E.2.1 of HEVC WD6) to wait after removal from the CPB of the access unit associated with the most recent buffering period SEI message in a preceding access unit before removing from the buffer the access unit data associated with the picture timing SEI message. This value may also be used to calculate an earliest possible time of arrival of access unit data into the CPB for the HSS, as specified in Annex C of HEVC WD6. The syntax element may be a fixed length code whose length in bits is given by cpb_removal_delay_length_minus1+1. The cpb_removal_delay may be the remainder of a modulo 2(cpb_removal_delay_length_minus1+1) counter. The value of cpb_removal_delay_length_minus1 that determines the length (in bits) of the syntax element cpb_removal_delay may be the value of cpb_removal_delay_length_minus1 coded in the sequence parameter set that is active for the primary coded picture associated with the picture timing SEI message. However, cpb_removal_delay may specify a number of clock ticks relative to the removal time of the preceding access unit containing a buffering period SEI message, which may be an access unit of a different coded video sequence.

The variable dpb_output_delay may be used to compute the DPB output time of the picture. This variable may specify how many clock ticks to wait after removal of the last decoding unit in an access unit from the CPB before the decoded picture is output from the DPB (see subclause C.2 of HEVC WD6). A picture may not be removed from the DPB at its output time when it is still marked as "used for short-term reference" or "used for long-term reference" in this example. Only one dpb_output_delay variable may be specified for a decoded picture in this example.

The length of the syntax element dpb_output_delay may be given in bits by dpb_output_delay_length_minus1+1. When max_dec_pic_buffering[max_temporal_layers_minus1] is equal to 0, dpb_output_delay may also be equal to 0.

The output time derived from the dpb_output_delay of any picture that is output from an output timing conforming decoder as specified in subclause C.2 of HEVC WD6 as modified by this disclosure may precede the output time derived from the dpb_output_delay of all pictures in any subsequent coded video sequence in decoding order.

The picture output order established by the values of this syntax element may be the same order as established by the values of PicOrderCnt( ) as specified by subclause C.5 of HEVC WD6.

For pictures that are not output by the "bumping" process of subclause C.5 of HEVC WD6 as modified by this disclosure because they precede, in decoding order, an IDR picture with no_output_of_prior_pics_flag equal to 1 or set to or inferred to be equal to 1, the output times derived from dpb_output_delay may be increasing with increasing value of PicOrderCnt( ) relative to all pictures within the same coded video sequence.

The variable num_decoding_units_minus1 plus 1 may specify the number of decoding units in the access unit the picture timing SEI message is associated with. The value of num_decoding_units_minus1 may be in the range of 0 to X, inclusive, for example.

The variable num_nalus_in_du_minus1[i] plus 1 may specify the number of NAL units in the i-th decoding unit of the access unit the picture timing SEI message is associated with. The value of num_nalus_in_du_minus1[i] may be in the range of 0 to X, inclusive, for example.

The first decoding unit of the access unit may include the first num_nalus_in_du_minus1[0]+1 consecutive NAL units in decoding order in the access unit. The i-th (with i greater than 0) decoding unit of the access unit may include the num_nalus_in_du_minus1[i]+1 consecutive NAL units immediately following the last NAL unit in the previous decoding unit of the access unit, in decoding order. There may be at least one VCL NAL unit in each decoding unit, for example.

The variable du_cpb_removal_delay[i] may specify how many clock ticks (see subclause E.2.1 of HEVC WD6) to wait after removal from the CPB of the first decoding unit in the access unit associated with the most recent buffering period SEI message in a preceding access unit before removing from the CPB the i-th decoding unit in the access unit associated with the picture timing SEI message. This value may also be used to calculate an earliest possible time of arrival of decoding unit data into the CPB for the HSS, as specified in Annex C of HEVC WD6. The syntax element may be a fixed length code whose length in bits may be given by cpb_removal_delay_length_minus1+1. The du_cpb_removal_delay[i] may be the remainder of a modulo 2(cpb_removal_delay_length_minus1+1) counter. The value of cpb_removal_delay_length_minus1 that determines the length (in bits) of the syntax element du_cpb_removal_delay[i] may be the value of cpb_removal_delay_length_minus1 coded in the sequence parameter set that is active for the coded picture associated with the picture timing SEI message. However, du_cpb_removal_delay[i] specifies a number of clock ticks relative to the removal time of the first decoding unit in the preceding access unit containing a buffering period SEI message, which may be an access unit of a different coded video sequence.

Figure 2:
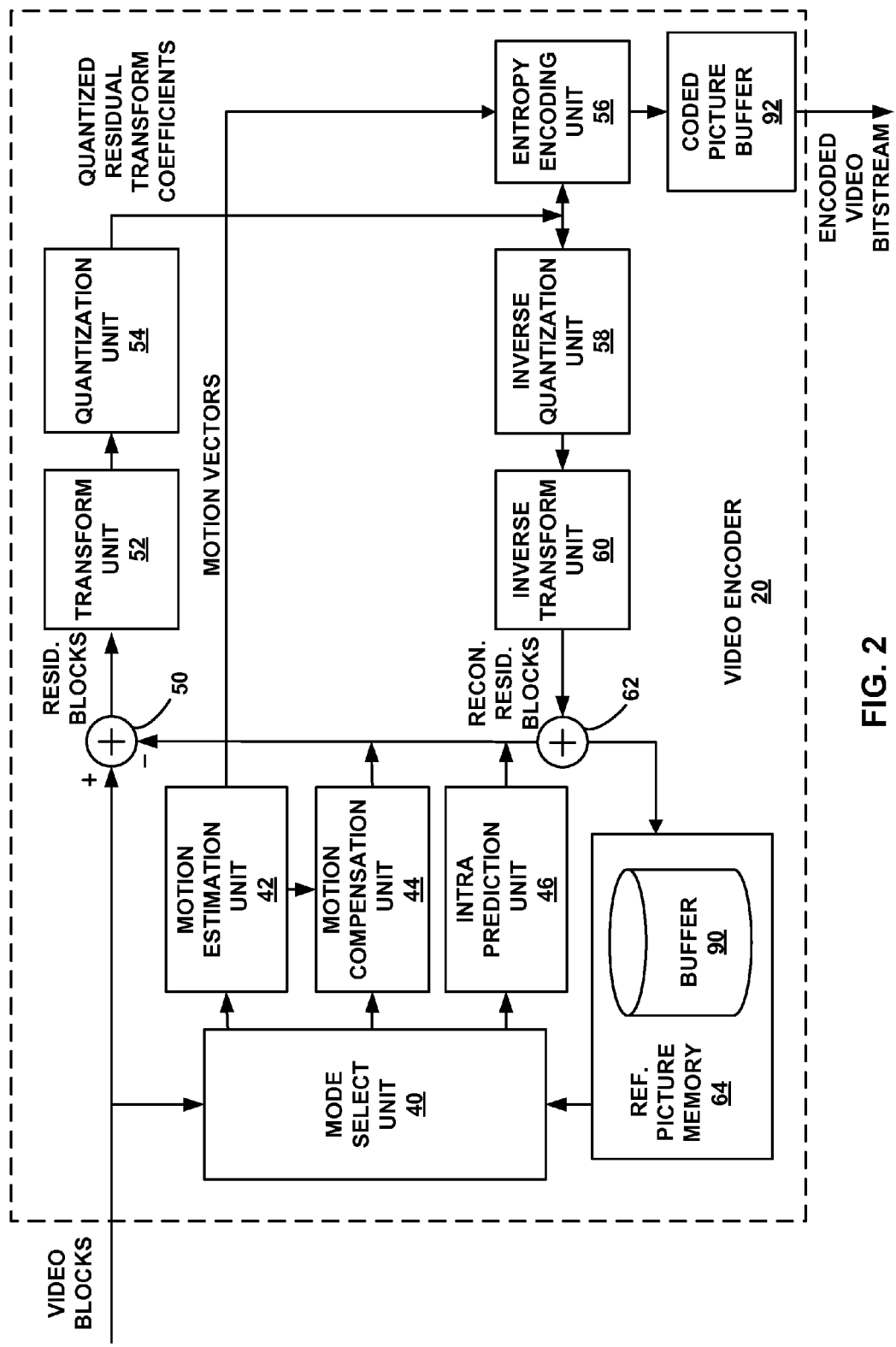
FIG. 2 is a block diagram illustrating an example of a video encoder that may implement techniques for deblocking edges between video blocks, in accordance with techniques of this disclosure.

FIG. 2 is a block diagram illustrating an example of video encoder 20 that may implement techniques involved with storing one or more decoding units of video data in a picture buffer, obtaining a respective buffer removal time for the one or more decoding units, removing the decoding units from the picture buffer in accordance with the obtained buffer removal time for each of the decoding units, and coding video data corresponding to the removed decoding units, among other functions, as described in this disclosure. Video encoder 20 may perform intra- and inter-coding of blocks within video frames, including coding units (CUs), or sub-CUs of CUs. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes. Although some components for inter-mode encoding are depicted in FIG. 2, it should be understood that video encoder 20 may further include components for intra-mode encoding, such as intra-prediction unit 46. Additional components that may also be included are not illustrated in FIG. 2 for the sake of brevity and clarity.

As shown in FIG. 2, video encoder 20 receives video blocks including a current video block within a video frame to be encoded. In the example of FIG. 2, video encoder 20 includes motion compensation unit 44, motion estimation unit 42, reference picture memory 64, summer 50, transform unit 52, quantization unit 54, entropy encoding unit 56, buffer 90, and coded picture buffer 92. For video block reconstruction, video encoder 20 also includes inverse quantization unit 58, inverse transform unit 60, and summer 62.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra-prediction unit 46 may also perform intra-predictive coding of the received video block relative to one or more neighboring blocks in the same frame or slice as the block to be coded to provide spatial compression.

Mode select unit 40 may select one of the coding modes, intra or inter, e.g., based on error results, and may provide the resulting intra- or inter-coded block to summer 50 to generate residual block data and to summer 62 to reconstruct the encoded block for use as a reference frame.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. As noted, motion estimation unit 42 and motion compensation unit 44 may be functionally integrated, in some examples.

In the case of inter-coding, motion estimation unit 42 calculates a motion vector for the video block of an inter-coded frame by comparing the video block to video blocks of a reference frame in reference picture memory 64. Motion compensation unit 44 may also interpolate sub-integer pixels of the reference frame, e.g., an I-frame or a P-frame. As an example, motion vectors may be predicted from two lists of reference frames: list 0, which includes reference frames having a display order earlier than a current frame being encoded, and list 1, which includes reference frames having a display order later than the current frame being encoded. Therefore, data stored in reference picture memory 64 may be organized according to these two lists of reference frames.

Motion estimation unit 42 compares blocks of one or more reference frames from reference picture memory 64 to a block to be encoded of a current frame, e.g., a P-frame or a B-frame. When the reference frames in reference picture memory 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in reference picture memory 64 if no values for sub-integer pixel positions are stored in reference picture memory 64. Motion estimation unit 42 sends the calculated motion vector to entropy encoding unit 56 and motion compensation unit 44. The reference frame block identified by a motion vector may be referred to as a predictive block.

Motion compensation unit 44 may calculate prediction data based on the predictive block. Video encoder 20 forms a residual video block by subtracting the prediction data provided by motion compensation unit 44 from the original video block being coded. Summer 50 represents the component or components that perform this subtraction operation. Transform unit 52 applies a transform, such as a discrete cosine transform (DCT) or a conceptually similar transform, to the residual block, producing a video block comprising residual transform coefficient values. Transform unit 52 may perform other transforms, such as those defined by the H.264 standard, which are conceptually similar to DCT. As other examples, transform unit 52 may perform wavelet transforms, integer transforms, sub-band transforms, or other types of transforms. Transform unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform content adaptive variable length coding (CAVLC), context adaptive binary arithmetic coding (CABAC), probability interval partitioning entropy coding (PIPE), or another entropy coding technique. Following the entropy coding by entropy encoding unit 56, the encoded video data may be buffered or stored more or less temporarily in coded picture buffer 92, transmitted to another device, and/or archived for later transmission or retrieval. In the case of context adaptive binary arithmetic coding, context may be based on neighboring macroblocks.

In some cases, entropy encoding unit 56 or another unit of video encoder 20 may be configured to perform other coding functions, in addition to entropy coding. For example, entropy encoding unit 56 may be configured to determine the coded block pattern (CBP) values for the macroblocks and partitions. Also, in some cases, entropy encoding unit 56 may perform run length coding of the coefficients in a largest coding unit (LCU) or a sub-CU of an LCU. In particular, entropy encoding unit 56 may apply a zigzag scan or other scan pattern to scan the transform coefficients in a LCU or partition and encode runs of zeros for further compression. Entropy encoding unit 56 and/or other elements of video encoder 20 may also form decoding units from encoded video data. The decoding units may be sub-pictures, such as a sequence of treeblocks, one or more slices, one or more waves, and/or one or more tiles, for example. Entropy encoding unit 56 and/or other elements of video encoder 20 may also add padding data for sub-pictures with different sizes to achieve byte alignment. Entropy encoding unit 56 also may construct header information with appropriate syntax elements for transmission in the encoded video bitstream. For example, header information may include signaling data indicating whether the decoding units are access units or sub-access units. This may include signaling a value for a sub-picture coded picture buffer preferred flag, signaled in HRD parameters. Entropy encoding unit 56 and/or other elements of video encoder 20 may also add syntax elements such as buffering period SEI messages, signaling VUI parameters, signaling data indicative of entry points for the various sub-pictures, and/or buffer removal times for the decoding units, for example.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Reference picture memory 64 may include buffer 90. Buffer 90 may be or include or be included in a data storage device such as any permanent or volatile memory capable of storing data, such as synchronous dynamic random access memory (SDRAM), embedded dynamic random access memory (eDRAM), or static random access memory (SRAM). Buffer 90 may include picture buffers and/or decoded picture buffers and may operate according to any combination of example coded picture buffer and/or decoded picture buffer behaviors described in this disclosure. For example, video encoder 20 may perform decoded block pattern (DPB) management using buffer 90 and/or coded block pattern (CPB) management of coded picture buffer 92 in accordance with techniques of this disclosure.

Coded picture buffer 92 may be or include or be included in a data storage device such as any permanent or volatile memory capable of storing data, such as synchronous dynamic random access memory (SDRAM), embedded dynamic random access memory (eDRAM), or static random access memory (SRAM). Although shown as forming part of video encoder 20, in some examples, coded picture buffer 92 may form part of a device, unit, or module external to video encoder 20. For example, coded picture buffer 92 may form part of a stream scheduler unit (or delivery scheduler or hypothetical stream scheduler (HSS)) external to video encoder 20. Video encoder 20 may form decoding units from encoded video data and provide the decoding units to the stream scheduler unit. Video encoder 20 may form the decoding units with varying numbers of bits or varying numbers of blocks, in some examples. The stream scheduler unit may implement techniques of this disclosure to send the decoding units, including sub-pictures, such as a sequence of treeblocks, one or more slices, one or more waves, and/or one or more tiles, to a video decoder for decoding, at times that may be indicated by an obtained (e.g., a signaled) buffer removal time. Video encoder 20 may form the decoding units each to include a number of coding blocks arranged continuously in decoding order, in some examples. The stream scheduler unit may further decapsulate access units to extract one or more network abstraction layer (NAL) units including the decoding units. Likewise, the stream scheduler unit may decapsulate the NAL units to extract the decoding units.

Video encoder 20 may store access units to and remove access units from coded picture buffer 92 in accordance with hypothetical reference decoder (HRD) behavior as modified by techniques of this disclosure. Video encoder 20 may apply HRD parameters including initial CPB removal delay, CPB size, bit rate, initial DPB output delay, and DPB size, as well as buffer removal times for the decoding units, and values for sub-picture coded picture buffer preferred flags to signal whether decoding units of video data are either access units or subsets of access units, for example. Video encoder 20 may form SEI messages in the access units that signal buffering periods and buffer removal times for the decoding units. For example, video encoder 20 may provide video usability information (VUI) parameters with syntax that includes a sub-picture CPB flag, such as in the example of Table 1 above.

The decoding units may include sub-pictures of a common picture, and video encoder 20 may include buffer removal times for each of the sub-pictures of the common picture in the SEI messages for the access units. The different sub-pictures may be encoded with different amounts of data, with some sub-pictures being encoded in different numbers of bits or blocks, and video encoder 20 may form a corresponding respective buffer removal time for each of the sub-pictures of a common picture. Video encoder 20 may also encode some pictures with sub-pictures of the same data size. Other components may also perform one or more of the functions ascribed above to video encoder 20. For example, an encapsulation unit of a source device (such as source device 12 of FIG. 1) may also form SEI messages that include any of the above parameters.

Therefore, video encoder 20 may provide that each sub-picture may include a number of coding blocks of a coded picture continuous in decoding order, and such that a coding block may be identical to a treeblock or a subset of a treeblock. Video encoder 20 may provide that coding of sub-pictures and allocation of bits to different sub-pictures in a picture may be performed without requiring that each sub-picture (i.e., treeblock group) in one picture is coded with the same amount of bits. Video encoder 20 may signal the CPB removal time for each sub-picture in the bitstream, instead of CPB removal times being derived according to signaled picture-level CPB removal times. Video encoder 20 may also include more than one sub-picture in a slice, and apply byte alignment at the end of each sub-picture. Video encoder 20 may also signal the entry point of each sub-picture with a value that indicates the byte alignment of at least one of the sub-pictures within a larger set of the video data, such as a slice, a tile, or a frame, for example. Video encoder 20 may apply any one or more of these features in different examples in accordance with this disclosure.

The locations shown for reference picture memory 64, buffer 90, and coded picture buffer 92 in FIG. 2 are for illustrative purposes. Reference picture memory 64, buffer 90, and coded picture buffer 92 may be located in a single storage device or any number of distinct storage devices. The storage devices may include any combination of volatile and/or non-volatile computer-readable media.

In this manner, video encoder 20 represents an example of a video coder configured to store one or more decoding units of video data in a picture buffer, obtain a respective buffer removal time for the one or more decoding units, remove the decoding units from the picture buffer in accordance with the obtained buffer removal time for each of the decoding units, and code video data corresponding to the removed decoding units, among other functions.

Figure 3:
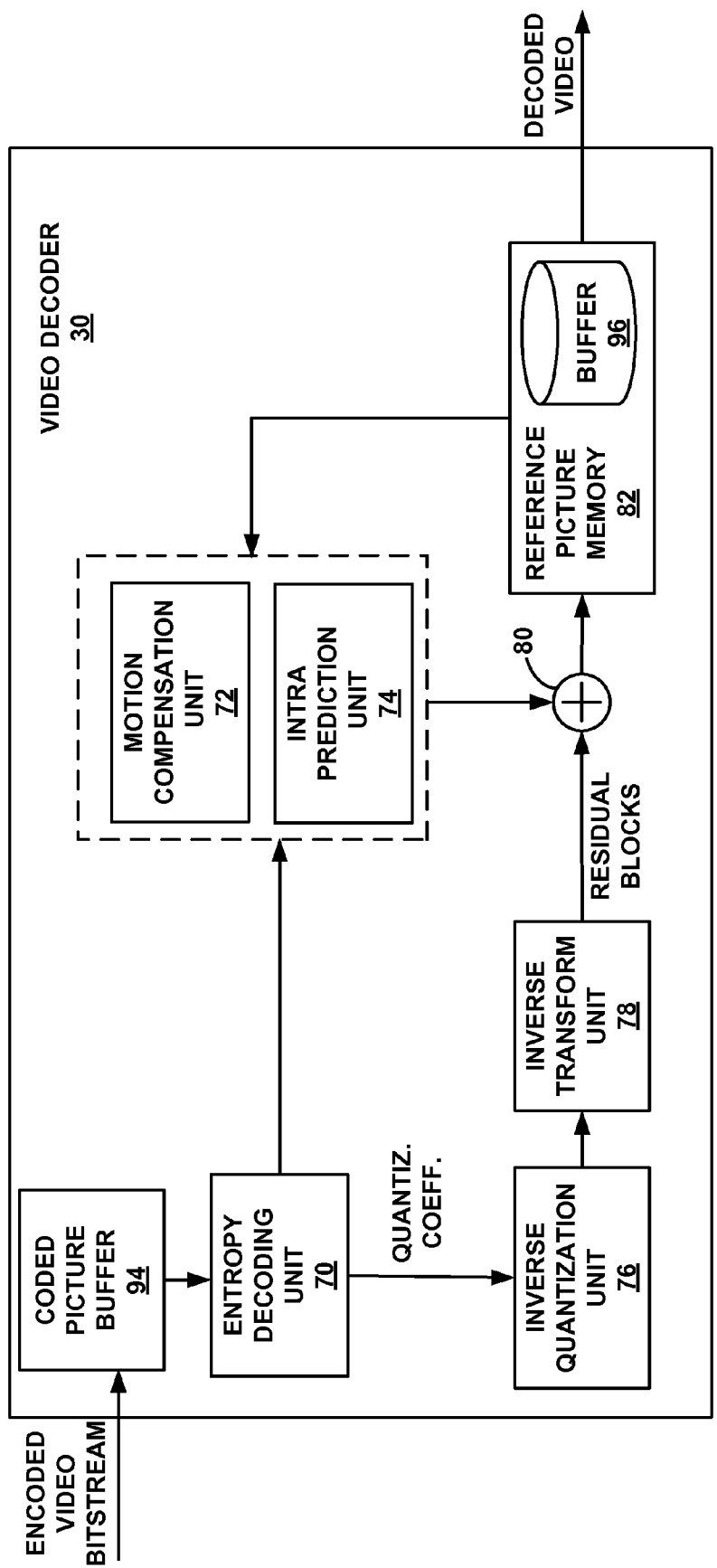
FIG. 3 is a block diagram illustrating an example of a video decoder, which decodes an encoded video sequence, in accordance with techniques of this disclosure.

FIG. 3 is a block diagram illustrating an example of video decoder 30, which decodes an encoded video sequence. In the example of FIG. 3, video decoder 30 includes an entropy decoding unit 70, motion compensation unit 72, intra prediction unit 74, inverse quantization unit 76, inverse transformation unit 78, reference picture memory 82, summer 80, coded picture buffer 94, and buffer 96. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70.

Motion compensation unit 72 may use motion vectors received in the bitstream to identify a prediction block in reference frames in reference picture memory 82. Intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by encoder 20 for each macroblock to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of macroblocks used to encode frame(s) of the encoded video sequence, partition information that describes how each macroblock of a frame of the encoded video sequence is partitioned, modes indicating how each partition is encoded, one or more reference frames (and reference frame lists) for each inter-encoded macroblock or partition, and other information to decode the encoded video sequence. Summer 80 sums the residual blocks with the corresponding prediction blocks generated by motion compensation unit 72 or intra-prediction unit to form decoded blocks.

Reference picture memory 82 may include buffer 96. Buffer 96 may be or include a data storage device such as any permanent or volatile memory capable of storing data, such as synchronous dynamic random access memory (SDRAM), embedded dynamic random access memory (eDRAM), or static random access memory (SRAM). Buffer 96 may include one or more picture buffers and/or one or more decoded picture buffers and may operate according to any combination of example coded picture buffer and/or decoded picture buffer behaviors described in this disclosure. For example, video decoder 30 may perform DPB management using buffer 96 and/or CPB management of coded picture buffer 94 in accordance with the techniques of this disclosure.

Coded picture buffer 94 may be implemented as a data storage device such as any permanent or volatile memory capable of storing data, such as synchronous dynamic random access memory (SDRAM), embedded dynamic random access memory (eDRAM), or static random access memory (SRAM). Coded picture buffer 94 may operate according to any combination of example coded picture buffer behaviors disclosed herein.

Although shown as forming part of video decoder 30, in some examples, coded picture buffer 94 may form part of a device, unit, or module external to video decoder 30. For example, coded picture buffer 94 may form part of a stream scheduler unit external to video decoder 30. The stream scheduler unit may implement the techniques of this disclosure to send decoding units including sub-pictures, such as a sequence of treeblocks, one or more slices, one or more waves, and/or one or more tiles to video decoder 30 for decoding at times indicated by an obtained (e.g., a signaled) buffer removal time. The stream scheduler unit may further decapsulate access units to extract one or more network abstraction layer (NAL) units including the decoding units. Likewise, the stream scheduler unit may decapsulate the NAL units to extract the decoding units.

Video decoder 30 may receive and store access units to and remove access units from coded picture buffer 94 in accordance with hypothetical reference decoder (HRD) behavior as modified by techniques of this disclosure. Video decoder 30 may decode and obtain HRD parameters including initial CPB removal delay, CPB size, bit rate, initial DPB output delay, and DPB size, as well as buffer removal times for the decoding units, and values for sub-picture coded picture buffer preferred flags that signal whether decoding units of video data are either access units or subsets of access units, for example. Video decoder 30 may decode and obtain SEI messages in the access units that signal buffering periods and buffer removal times for the decoding units. For example, video decoder 30 may decode and obtain video usability information (VUI) parameters with syntax that includes a sub-picture CPB flag, such as in the example of Table 1 above.

The decoding units may include sub-pictures of a common picture, and video decoder 30 may decode and obtain buffer removal times for each of the sub-pictures of the common picture in the SEI messages for the access units. The different sub-pictures may be encoded with different amounts of data, with some sub-pictures being encoded in different numbers of bits or blocks, and video decoder 30 may decode and obtain a corresponding respective buffer removal time for each of the sub-pictures of a common picture. Video decoder 30 may also decode and obtain some pictures with sub-pictures of the same data size.

Therefore, video decoder 30 may decode and obtain sub-pictures that may include a number of coding blocks of a coded picture continuous in decoding order, and such that a coding block may be identical to a treeblock or a subset of a treeblock. Video decoder 30 may, in some examples, decode and obtain CPB removal times for each sub-picture in the bitstream, instead of deriving CPB removal times according to signaled picture-level CPB removal times. Video decoder 30 may also decode and obtain more than one sub-picture in a slice, and may receive byte offset information indicative of the starting points for each decoding unit, to determine where each decoding unit begins, and decode and obtain information on extra non-data signal or padding signal that provides byte alignment at the end of each sub-picture. Video decoder 30 may also obtain the entry point of each sub-picture with a value that indicates the byte alignment of at least one of the sub-pictures within a larger set of the video data, such as a slice, a tile, or a frame, for example. Video decoder 30 may apply any one or more of these features in different examples in accordance with this disclosure.

The locations shown for reference picture memory 82, buffer 96, and coded picture buffer 94 in FIG. 3 are for illustrative purposes. Reference picture memory 82, buffer 96, and coded picture buffer 94 may be located in a single storage device or any number of distinct storage devices.

The storage devices may include any combination of volatile and/or non-volatile computer-readable media.

In this manner, video decoder 30 represents an example of a video coder configured to store one or more decoding units of video data in a picture buffer, obtain a respective buffer removal time for the one or more decoding units, remove the decoding units from the picture buffer in accordance with the obtained buffer removal time for each of the decoding units, and code video data corresponding to the removed decoding units.

Figure 4:
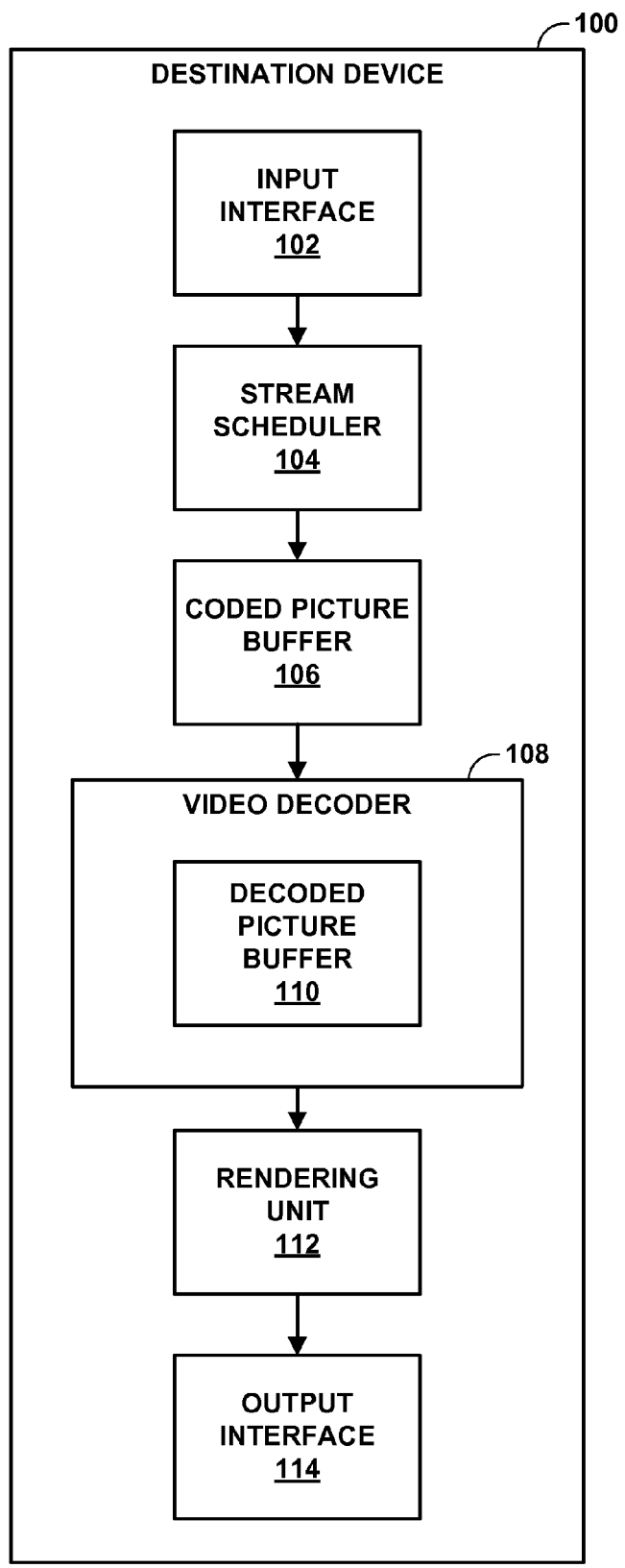
FIG. 4 is a block diagram illustrating an example destination device that may implement any or all of the techniques of this disclosure.

FIG. 4 is a block diagram illustrating an example destination device 100 that may implement any or all of the techniques of this disclosure. In this example, destination device 100 includes input interface 102, stream scheduler 104, coded picture buffer 106, video decoder 108, decoded picture buffer 110, rendering unit 112, and output interface 114. Destination device 100 may correspond substantially to destination device 14 (FIG. 1). Input interface 102 may comprise any input interface capable of receiving a coded bitstream of video data. For example, input interface 102 may comprise a receiver 26 and/or a modem 28 as in FIG. 1, a network interface, such as a wired or wireless interface, a memory or memory interface, a drive for reading data from a disc, such as an optical drive interface or magnetic media interface, or other interface component.

Input interface 102 may receive a coded bitstream including video data and provide the bitstream to stream scheduler 104. In accordance with the techniques of this disclosure, stream scheduler 104 extracts units of video data, such as access units and/or decoding units, from the bitstream and stores the extracted units to coded picture buffer 106. In this manner, stream scheduler 104 represents an example implementation of an HSS as discussed in the examples above. Coded picture buffer 106 may conform substantially to coded picture buffer 94 (FIG. 3), except that as shown in FIG. 4, coded picture buffer 106 is separate from video decoder 108. Coded picture buffer 106 may be separate from or integrated as part of video decoder 108 in different examples.

Video decoder 108 includes decoded picture buffer 110. Video decoder 108 may conform substantially to video decoder 30 of FIGS. 1 and 3. Decoded picture buffer 110 may conform substantially to buffer 96. Thus, video decoder 108 may decode decoding units of coded picture buffer 106 in accordance with the techniques of this disclosure.

Moreover, video decoder 108 may output decoded pictures from decoded picture buffer 110 in accordance with the techniques of this disclosure, as discussed above. Video decoder 108 may pass output pictures to rendering unit 112. Rendering unit 112 may crop pictures as discussed above in accordance with the techniques of this disclosure, then pass the cropped pictures to output interface 114. Output interface 114, in turn, may provide the cropped pictures to a display device, which may conform substantially to display device 32. The display device may form part of destination device 100, or may be communicatively coupled to destination device 100. For example, the display device may comprise a screen, touchscreen, projector, or other display unit integrated with destination device 100, or may comprise a separate display such as a television, monitor, projector, touchscreen, or other device that is communicatively coupled to destination device 100. The communicative coupling may comprise a wired or wireless coupling, such as by a coaxial cable, composite video cable, component video cable, a High-Definition Multimedia Interface (HDMI) cable, a radio-frequency broadcast, or other wired or wireless coupling.

Figure 5:
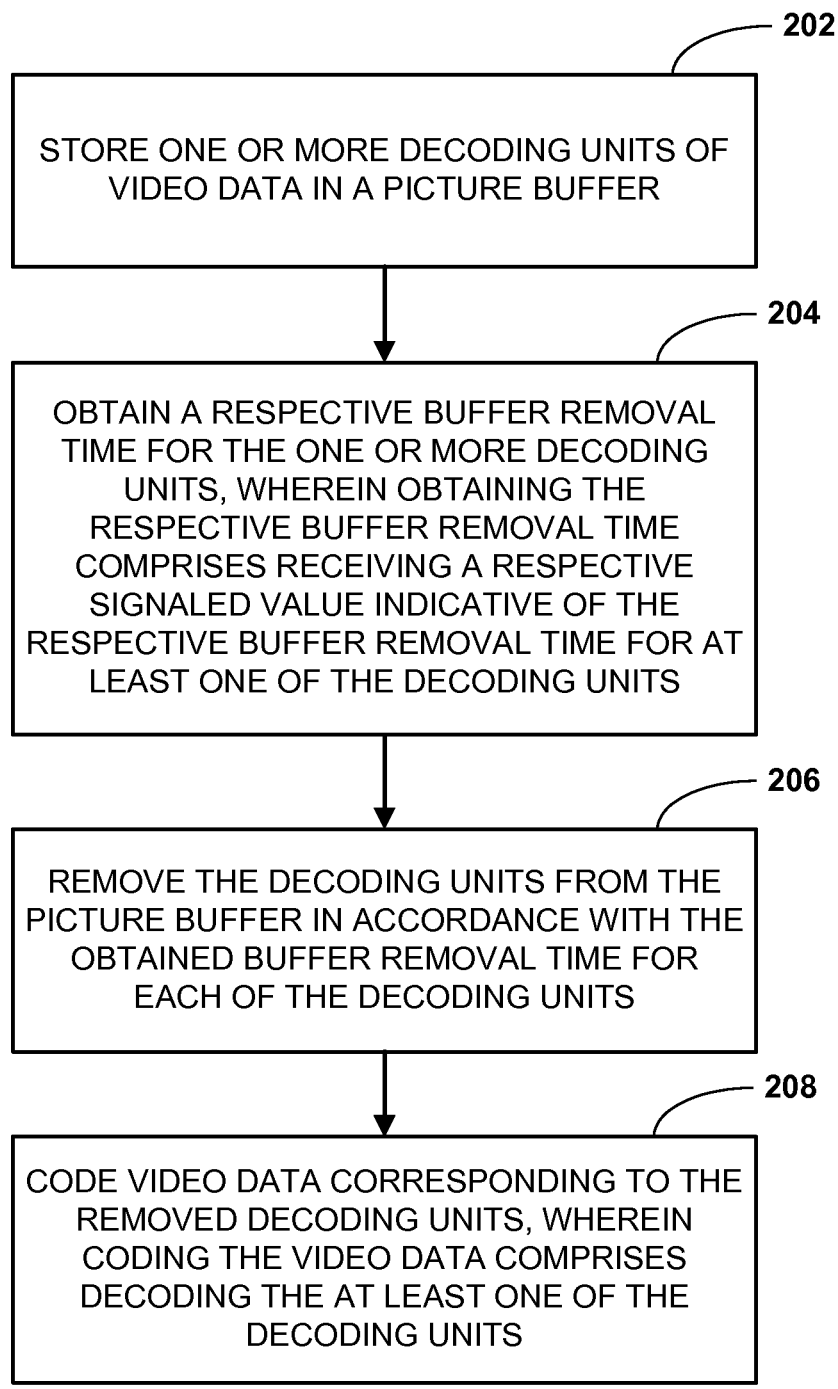
FIG. 5 is a flowchart that illustrates an example method that includes removing decoding units of video data from a picture buffer in accordance with an obtained buffer removal time, in accordance with techniques of this disclosure.

FIG. 5 is a flowchart that illustrates an example method that includes removing decoding units of video data from a picture buffer in accordance with an obtained buffer removal time, e.g., by video decoder 30 of FIG. 1 or 3 or video decoder 108 of FIG. 4 (collectively "video decoder 30/108"), in accordance with techniques of this disclosure. The example method of FIG. 5 may be described as being carried out by video decoder 30/108 as one example, with the understanding that any one or more aspects of the method of FIG. 5 may also be performed by or implemented with other devices or components. In the example of FIG. 5, video decoder 30/108 may store one or more decoding units of video data in a picture buffer (202). Video decoder 30/108 may obtain a respective buffer removal time for the one or more decoding units, wherein obtaining the respective buffer removal time comprises receiving a respective signaled value indicative of the respective buffer removal time for at least one of the decoding units (204). Video decoder 30/108 may remove the decoding units from the picture buffer in accordance with the obtained buffer removal time for each of the decoding units (206). Video decoder 30/108 may also code video data corresponding to the removed decoding units, wherein coding the video data comprises decoding the at least one of the decoding units (208). Video decoder 30/108 and/or other devices or elements may also perform different or additional functions in other examples.

Figure 6:
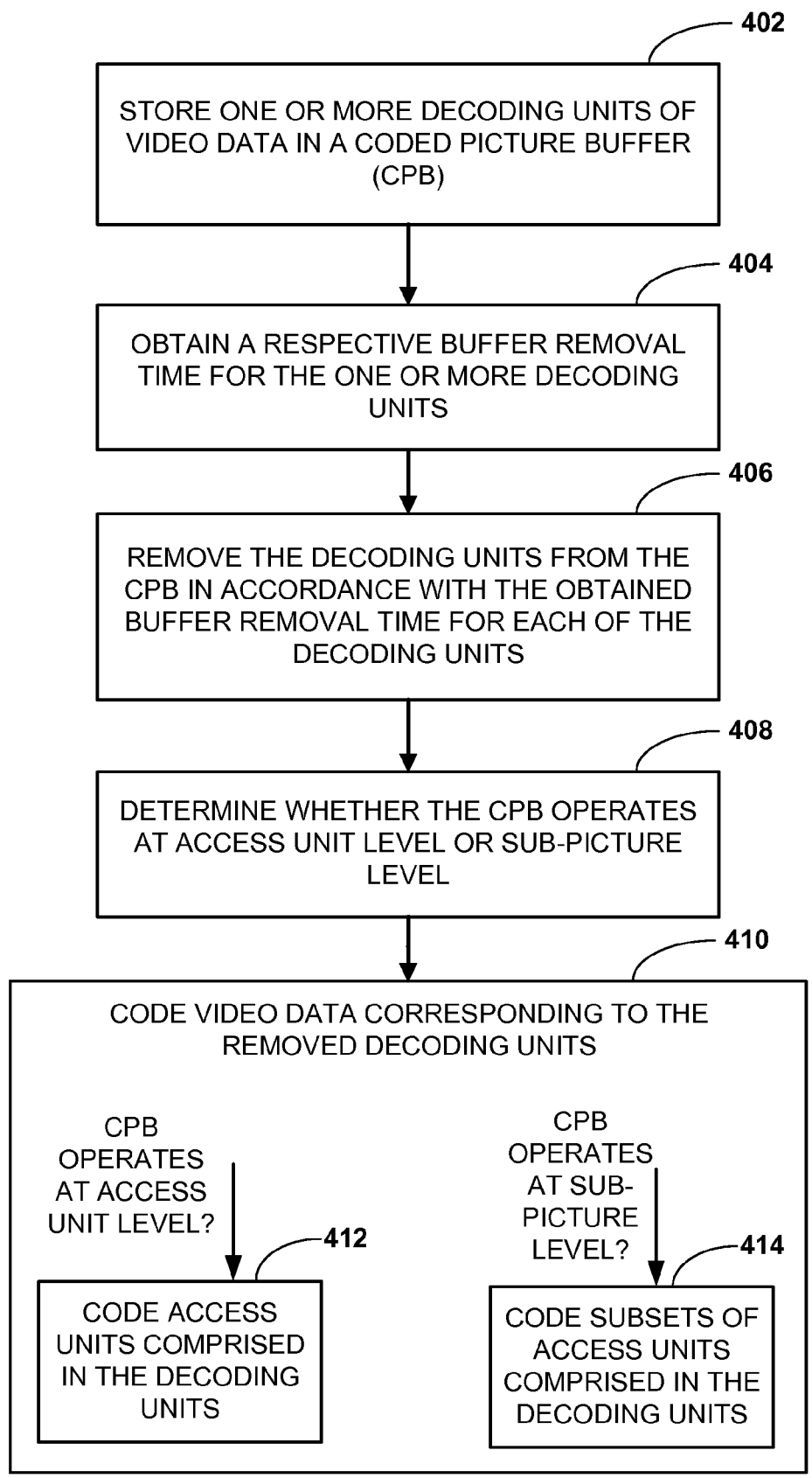
FIG. 6 is a flowchart that illustrates another example method that includes removing decoding units of video data from a picture buffer in accordance with an obtained buffer removal time, in accordance with techniques of this disclosure.

FIG. 6 is a flowchart that illustrates another example method, similar in some respects to the method of FIG. 5, that includes removing decoding units of video data from a picture buffer in accordance with an obtained buffer removal time, e.g., by video decoder 30 of FIG. 1 or 3 or video decoder 108 of FIG. 4 (collectively "video decoder 30/108"), in accordance with techniques of this disclosure. The example method of FIG. 6 may also be described as being carried out by video decoder 30/108 as one example, with the understanding that any one or more aspects of the method of FIG. 6 may also be performed by or implemented with other devices or components. In the example of FIG. 6, video decoder 30/108 may store one or more decoding units of video data in a coded picture buffer (CPB) (402), obtain a respective buffer removal time for the one or more decoding units (404), remove the decoding units from the CPB in accordance with the obtained buffer removal time for each of the decoding units (406), determining whether the CPB operates at access unit level or sub-picture level (408), and code video data corresponding to the removed decoding units (410). If the CPB operates at access unit level, coding the video data includes coding access units comprised in the decoding units (412). If the CPB operates at sub-picture level, coding the video data includes coding subsets of access units comprised in the decoding units (414).

For example, if video decoder 30/108 determines that the CPB operates at access unit level, video decoder 30/108 may code access units of video data corresponding to the removed decoding units (412). If video decoder 30/108 determines that the CPB operates at sub-picture level, video decoder 30/108 may code subsets of access units of video data corresponding to the removed decoding units (414). For example, video decoder 30/108 may determine that the one or more decoding units comprise access units by determining that either a sub-picture coded picture buffer preferred flag (e.g., SubPicCpbPreferredFlag) is negative or has a value of zero, or that a sub-picture coded picture buffer parameters present flag (e.g., sub_pic_cpb_params_present_flag) is negative or has a value of zero. Video decoder 30/108 may determine that the one or more decoding units comprise subsets of access units by determining that both a sub-picture coded picture buffer preferred flag (e.g., SubPicCpb-PreferredFlag) is positive or has a value of one, and that a sub-picture coded picture buffer parameters present flag (e.g., sub_pic_cpb_params_present_flag) is positive or has a value of one. Video decoder 30/108 may also use a single sub-picture coded picture buffer flag, SubPicCpbFlag, which may be set to SubPicCpbPreferredFlag && sub_pic_cpb_params_present_flag, to determine if both underlying flags are positive and that video decoder 30/108 may code for subsets of access units.

Figure 7:
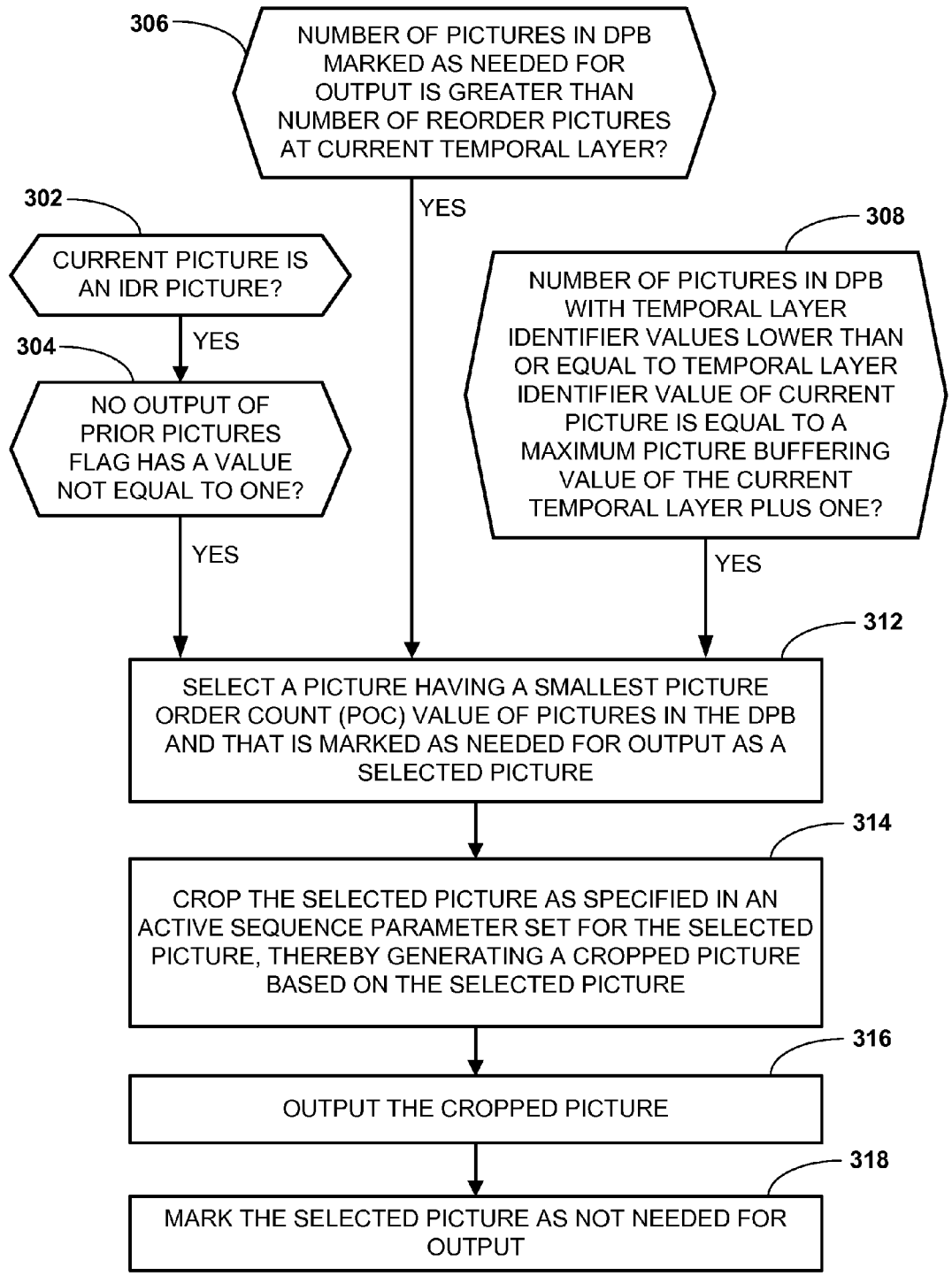
FIG. 7 is a flowchart that illustrates another example method of processing video data that includes outputting a cropped picture in a bumping process, in accordance with techniques of this disclosure.

FIG. 7 is a flowchart that illustrates another example method of processing video data that includes outputting a cropped picture in a bumping process, e.g., by video decoder 30 of FIG. 1 or 3 or video decoder 108 of FIG. 4 (collectively "video decoder 30/108"), in accordance with techniques of this disclosure. In the example of FIG. 7, video decoder 30/108 may perform a bumping process if any of certain conditions are met, as described above with reference to bumping process examples. In particular, video decoder 30/108 may perform a bumping process if a current picture is an instantaneous decoding refresh (IDR) picture (302) and a no output of prior pictures flag has a value that is not equal to one (304), which may include if the no output of prior pictures flag has a value that is not inferred to be equal to 1 or set to be equal to 1, e.g., by the HRD. Video decoder 30/108 may also perform a bumping process if a number of pictures in a decoded picture buffer (DPB) that are marked as needed for output is greater than a number of reorder pictures at a current temporal layer (306). Video decoder 30/108 may also perform a bumping process if a number of pictures in the DPB with temporal layer identifier values lower than or equal to the temporal layer identifier value of a current picture is equal to a maximum picture buffering value of the current temporal layer plus one (308).

If any of the specified conditions (302 and 304, or 306, or 308) are met, video decoder 30/108 may perform a bumping process as follows. Video decoder 30/108 may select a picture having a smallest picture order count (POC) value of pictures in the DPB and that is marked as needed for output as a selected picture (312). Video decoder 30/108 may crop the selected picture as specified in an active sequence parameter set for the selected picture, thereby generating a cropped picture based on the selected picture (314). Video decoder 30/108 may output the cropped picture (316). Video decoder 30/108 may mark the selected picture as not needed for output (318).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   storing a plurality of decoding units associated with an access unit of the video data in a picture buffer, each decoding unit of the plurality being a subset of the access unit, and each decoding unit of the plurality comprising at least one video coding layer (VCL) network abstraction layer (NAL) unit of the access unit and any non-VCL NAL unit that is associated with the at least one VCL NAL unit;
   obtaining a respective buffer removal time for each stored decoding unit of the plurality of stored decoding units, wherein obtaining the respective buffer removal time for a respective stored decoding unit comprises receiving respective signaled information indicative of the respective buffer removal time for the respective stored decoding unit;
removing the plurality of stored decoding units from the picture buffer in accordance with the obtained buffer removal times; and
coding the video data corresponding to the plurality of removed decoding units, wherein coding the video data comprises decoding the plurality of removed decoding units.

2. The method of claim 1, wherein storing the plurality of decoding units in the picture buffer comprises storing the plurality of decoding units of the video data in a continuous decoding order in the picture buffer.

3. The method of claim 2, further comprising receiving the plurality of decoding units of the video data in the continuous decoding order prior to storing the plurality of received decoding units in the picture buffer.

4. The method of claim 1, wherein the picture buffer is a coded picture buffer.

5. The method of claim 4, the method further comprising removing a first decoding unit of the plurality of stored decoding units from the coded picture buffer prior to removing a second decoding unit of the plurality of stored decoding units from the coded picture buffer, wherein the first decoding unit and the second decoding unit comprise respective subsets of the access unit.

6. The method of claim 1, wherein the respective signaled information indicative of the buffer removal time further comprises a signaled value indicative of a number of network abstraction layer (NAL) units included in the respective stored decoding unit.

7. The method of claim 1, wherein the plurality of decoding units comprise a plurality of sub-pictures of a common picture, and wherein receiving the respective signaled information indicative of the respective buffer removal time comprises receiving a respective signaled value indicative of the buffer removal time for each of the sub-pictures of the common picture.

8. The method of claim 1, wherein the picture buffer is a coded picture buffer (CPB), and wherein receiving the respective signaled information indicative of the buffer removal time comprises receiving respective signaled values indicative of one or more of an initial CPB removal delay at an access unit level, an initial CPB removal delay offset at the access unit level, an initial CPB removal delay at a sub-picture level, or an initial CPB removal delay offset at the sub-picture level.

9. The method of claim 1, wherein the respective signaled information indicative of the buffer removal time is included in a picture timing supplemental enhancement information (SEI) message.

10. The method of claim 1, wherein the respective signaled information indicative of the buffer removal time is included in a decoding unit timing supplemental enhancement information (SEI) message.

11. The method of claim 1, wherein removing the plurality of stored decoding units from the picture buffer in accordance with the obtained respective buffer removal times comprises removing at least one stored decoding unit of the plurality of stored decoding units from the picture buffer after a respective obtained buffer removal time for the at least one stored decoding unit has passed since the at least one stored decoding unit was stored in the picture buffer.

12. The method of claim 1, wherein each of the plurality of stored decoding units comprises one or more respective sub-pictures.

13. The method of claim 12, further comprising receiving a signaled value indicative of a byte alignment of at least one sub-picture of the one or more respective sub-pictures within a larger set of the video data, the larger set of the video data comprising the at least one sub-picture.

14. The method of claim 13, wherein the larger set of the video data comprises at least one of an access unit, a subset of an access unit, a picture, a frame, a slice, a wave, or a tile.

15. The method of claim 12, wherein each sub-picture of the one or more sub-pictures corresponds to at least one of one or more sequences of blocks of the video data, one or more slices, one or more waves, one or more tiles, or one or more network abstraction layer (NAL) units.

16. The method of claim 1, wherein obtaining the respective buffer removal time for a respective stored decoding unit of the plurality of stored decoding units comprises performing one of:
based on the respective decoding unit comprising an ordinal first decoding unit of the video data, determining that the buffer removal time comprises a coded picture buffer removal delay value specified in a buffering period supplemental enhancement information (SEI) message associated with an access unit that comprises the respective decoding unit; or
based on the respective decoding unit not comprising the ordinal first decoding unit of the video data, wherein the respective decoding unit comprises an ordinal $i^{th}$ decoding unit where i>0, determining that the buffer removal time comprises a decoding unit coded picture buffer removal delay [i] specified in the picture timing SEI message associated with the access unit that comprises the respective decoding unit.

17. The method of claim 1, wherein obtaining the respective buffer removal time for a respective stored decoding unit of the plurality of stored decoding units comprises performing one of:
based on the respective decoding unit comprising an ordinal first decoding unit of an access unit of the video data, determining that a nominal removal time for the decoding unit comprises an initial coded picture buffer removal delay value divided by 90000; or
based on the respective decoding unit not comprising the ordinal first decoding unit of the access unit, wherein the decoding unit comprises an ordinal $m^{th}$ decoding unit where m>0 of the access unit, determining that a nominal removal time for the decoding unit comprises a nominal removal time of an ordinal first decoding unit of a previous buffering period plus a clock tick times a coded picture buffer removal delay associated with the ordinal $m^{th}$ decoding unit.

18. The method of claim 1, wherein at least two stored decoding units of the plurality of stored decoding units include different numbers of coding blocks, and wherein coding the video data corresponding to the plurality of removed decoding units comprises coding the different numbers of coding blocks in the at least two stored decoding units.

19. The method of claim 1, wherein at least two stored decoding units of the plurality of stored decoding units include different numbers of bits, and wherein coding the video data corresponding to the plurality of removed decoding units comprises coding the different numbers of bits in the at least two stored decoding units.

20. A device for decoding video data, the device comprising:
  a memory configured to store at least a portion of the video data; and
  a video decoder configured to:
    store a plurality of decoding units associated with an access unit of video data in a picture buffer, each decoding unit of the plurality being a subset of the access unit, and each decoding unit of the plurality comprising at least one video coding layer (VCL) network abstraction layer (NAL) unit of the access unit and any non-VCL NAL unit that is associated with the at least one VCL NAL unit;
    obtain a respective buffer removal time for each stored decoding unit of the plurality of stored decoding units, wherein to obtain the respective buffer removal time for a respective stored decoding unit, the video decoder is configured to receive respective signaled information indicative of the respective buffer removal time for the respective stored decoding unit;
    remove the plurality of stored decoding units from the picture buffer in accordance with the obtained buffer removal times; and
    code the video data corresponding to the plurality of removed decoding units, wherein to code the video data, the video decoder is configured to decode the plurality of removed decoding units.

21. The device of claim 20, wherein the video decoder is further configured to store the plurality of decoding units of the video data in a continuous decoding order in the picture buffer.

22. The device of claim 21, wherein the video decoder is further configured to receive the plurality of decoding units of the video data in the continuous decoding order prior to storing the plurality of received decoding units in the picture buffer.

23. The device of claim 20, wherein the picture buffer is a coded picture buffer.

24. The device of claim 23, wherein the video decoder is further configured to remove a first decoding unit of the plurality of stored decoding units from the coded picture buffer prior to removal of a second decoding unit of the plurality of stored decoding units from the coded picture buffer, wherein the first decoding unit and the second decoding unit comprise respective subsets of the access unit.

25. The device of claim 20, wherein the respective signaled information indicative of the buffer removal time further comprises a signaled value indicative of a number of network abstraction layer (NAL) units included in the respective stored decoding unit.

26. The device of claim 20, wherein the plurality of decoding units comprise a plurality of sub-pictures of a common picture, and wherein the decoder is further configured to receive a respective signaled value indicative of the buffer removal time for each of the sub-pictures of the common picture.

27. The device of claim 20, wherein the picture buffer is a coded picture buffer (CPB), and wherein the decoder is further configured to receive respective signaled values indicative of one or more of an initial CPB removal delay at an access unit level, an initial CPB removal delay offset at the access unit level, an initial CPB removal delay at a sub-picture level, or an initial CPB removal delay offset at the sub-picture level.

28. The device of claim 20, wherein the decoder is further configured to obtain the respective signaled information indicative of the buffer removal time from a picture timing supplemental enhancement information (SEI) message.

29. The device of claim 20, wherein the decoder is further configured to obtain the respective signaled information indicative of the buffer removal time from a supplemental enhancement information (SEI) message.

30. The device of claim 20, wherein, the video decoder is further configured to remove at least one stored decoding unit of the plurality of stored decoding units from the picture buffer after a respective obtained buffer removal time for the at least one stored decoding unit has passed since the at least one stored decoding unit was stored in the picture buffer.

31. The device of claim 20, wherein each of the plurality of stored decoding units comprises one or more respective sub-pictures.

32. The device of claim 31, wherein the video decoder is further configured to receive a signaled value indicative of a byte alignment of at least one sub-picture of the one or more respective sub-pictures within a larger set of the video data, the larger set of the video data comprising the at least one sub-picture.

33. The device of claim 32, wherein video decoder is further configured to receive the larger set of the video data as at least one of an access unit, a subset of an access unit, a picture, a frame, a slice, a wave, or a tile.

34. The device of claim 31, wherein the video decoder is configured to receive each sub-picture of the one or more sub-pictures corresponding to at least one of one or more sequences of blocks of video data, one or more slices, one or more waves, one or more tiles, or one or more network abstraction layer (NAL) units.

35. The device of claim 20, wherein, the video decoder is further configured to:
  determine, based on the respective decoding unit comprising an ordinal first decoding unit of the video data, that the buffer removal time comprises a coded picture buffer removal delay value specified in a buffering period supplemental enhancement information (SEI) message associated with an access unit that comprises the respective decoding unit; and
  determine, based on the respective decoding unit not comprising the ordinal first decoding unit of the video data, wherein the respective decoding unit comprises an ordinal $i^{th}$ decoding unit where i>0, that the buffer removal time comprises a decoding unit coded picture buffer removal delay as specified in the picture timing SEI message associated with the access unit that comprises the respective decoding unit.

36. The device of claim 20, wherein the video decoder is further configured to:
  determine, based on the respective decoding unit comprising an ordinal first decoding unit of an access unit of the video data, that a nominal removal time for the decoding unit comprises an initial coded picture buffer removal delay value divided by 90000; and
  determine, based on the respective decoding unit not comprising the ordinal first decoding unit of the access unit, wherein the decoding unit comprises an ordinal $m^{th}$ decoding unit where m>0 of the access unit, that a nominal removal time for the decoding unit comprises a nominal removal time of an ordinal first decoding unit of a previous buffering period plus a clock tick times a coded picture buffer removal delay associated with the ordinal $m^{th}$ decoding unit.

37. The device of claim 20, wherein at least two stored decoding units of the plurality of stored decoding units include different numbers of coding blocks, and wherein, the video decoder is further configured to code the different numbers of coding blocks in the at least two stored decoding units.

38. The device of claim 20, wherein at least two stored decoding units of the plurality of stored decoding units include different numbers of bits, and wherein, the video decoder is further configured to code the different numbers of bits in the at least two stored decoding units.

39. The device of claim 20, wherein the device comprises at least one of:
one or more integrated circuits;
one or more microprocessors;
one or more digital signal processors (DSPs);
one or more field programmable gate arrays (FPGAs);
a desktop computer;
a laptop computer;
a tablet computer;
a phone;
a television;
a camera;
a display device;
a digital media player;
a video game console;
a video game device;
a video streaming device; or
a wireless communication device.

40. The device of claim 20, wherein the picture buffer is a coded picture buffer, and wherein the video decoder is further configured to store one or more decoded pictures in a decoded picture buffer.

41. The device of claim 20, wherein the picture buffer is a coded picture buffer, and wherein the video decoder is further configured to store coded video data in the coded picture buffer.

42. The device of claim 20, wherein the picture buffer is a coded picture buffer, and the device further comprises a stream scheduling unit configured to store coded video data to the coded picture buffer.

43. An apparatus for decoding video data, the apparatus comprising:
means for storing a plurality of decoding units associated with an access unit of video data in a picture buffer, each decoding unit of the plurality being a subset of the access unit, and each decoding unit of the plurality comprising at least one video coding layer (VCL) network abstraction layer (NAL) unit of the access unit and any non-VCL NAL unit that is associated with the at least one VCL NAL unit;
means for obtaining a respective buffer removal time for each stored decoding unit of the plurality of stored decoding units, wherein the means for obtaining the respective buffer removal time for a respective stored decoding unit comprises means for receiving a respective signaled information indicative of the respective buffer removal time for the respective stored decoding unit;
means for removing the plurality of stored decoding units from the picture buffer in accordance with the obtained buffer removal times; and
means for coding the video data corresponding to the plurality of removed decoding units, wherein the means for coding the video data comprises means for decoding the plurality of removed decoding units.

44. The apparatus of claim 43, wherein the means for storing the plurality of decoding units in the picture buffer comprises means for storing the plurality of decoding units of the video data in a continuous decoding order in the picture buffer.

45. The apparatus of claim 44, further comprising means for receiving the plurality of decoding units of the video data in the continuous decoding order prior to storing the received plurality of decoding units in the picture buffer.

46. The apparatus of claim 43, wherein the picture buffer is a coded picture buffer.

47. The apparatus of claim 46, further comprising means for removing a first decoding unit of the plurality of stored decoding units from the coded picture buffer prior to removing a second decoding unit of the plurality of stored decoding units from the coded picture buffer, wherein the first decoding unit and the second decoding unit comprise respective subsets of the access unit.

48. The apparatus of claim 43, wherein the respective signaled information indicative of the buffer removal time further comprises a signaled value indicative of a number of network abstraction layer (NAL) units included in the respective stored decoding unit.

49. The apparatus of claim 43, wherein the decoding units plurality of comprise a plurality of sub-pictures of a common picture, and wherein the means for receiving the respective signaled value indicative of the respective buffer removal time comprises means for receiving a respective signaled value indicative of the buffer removal time for each of the sub-pictures of the common picture.

50. The apparatus of claim 43, wherein the picture buffer is a coded picture buffer (CPB), and wherein the means for receiving the respective signaled information indicative of the buffer removal time comprises means for receiving respective signaled values indicative of one or more of an initial CPB removal delay at an access unit level, an initial CPB removal delay offset at the access unit level, an initial CPB removal delay at a sub-picture level, or an initial CPB removal delay offset at the sub-picture level.

51. The apparatus of claim 43, wherein the respective signaled information indicative of the buffer removal time is included in a picture timing supplemental enhancement information (SEI) message.

52. The apparatus of claim 43, wherein the respective signaled information indicative of the buffer removal time is included in a decoding unit timing supplemental enhancement information (SEI) message.

53. The apparatus of claim 43, wherein the means for removing the plurality of stored decoding units from the picture buffer in accordance with the respective obtained buffer removal times comprises means for removing at least one stored decoding unit of the plurality of stored decoding units from the picture buffer after a respective obtained buffer removal time for the at least one stored decoding unit has passed since the at least one stored decoding unit was stored in the picture buffer.

54. The apparatus of claim 43, wherein each of the plurality of stored decoding units comprises one or more respective sub-pictures.

55. The apparatus of claim 54, further comprising means for receiving a signaled value indicative of a byte alignment of at least one sub-picture of the one or more respective sub-pictures within a larger set of the video data, the larger set of the video data comprising the at least one sub-picture.

56. The apparatus of claim 55, wherein the larger set of the video data comprises at least one of an access unit, a subset of an access unit, a picture, a frame, a slice, a wave, or a tile.

57. The apparatus of claim 54, wherein each sub-picture of the one or more sub-pictures corresponds to at least one of one or more sequences of blocks of video data, one or more slices, one or more waves, one or more tiles, or one or more network abstraction layer (NAL) units.

58. The apparatus of claim 43, wherein the means for obtaining the respective buffer removal time for a respective stored decoding unit of the plurality of stored decoding units comprises one of:
means for determining, based on the respective decoding unit comprising an ordinal first decoding unit of the video data, that the buffer removal time comprises a coded picture buffer removal delay value specified in a buffering period supplemental enhancement information (SEI) message associated with an access unit that comprises the respective decoding unit; or
means for determining, based on the respective decoding unit not comprising the ordinal first decoding unit of the video data, wherein the respective decoding unit comprises an ordinal $i^{th}$ decoding unit where i>0, that the buffer removal time comprises a decoding unit coded picture buffer removal delay [i] as specified in the picture timing SEI message associated with the access unit that comprises the respective decoding unit.

59. The apparatus of claim 43, wherein the means for obtaining the respective buffer removal time for a respective stored decoding unit of the plurality of stored decoding units comprises one of:
means for determining, based on the respective decoding unit comprises an ordinal first decoding unit of an access unit of the video data, that a nominal removal time for the decoding unit comprises an initial coded picture buffer removal delay value divided by 90000; and
means for determining, based on the respective decoding unit not comprising the ordinal first decoding unit of the access unit, wherein the decoding unit comprises an ordinal $m^{th}$ decoding unit where m>0 of the access unit, that a nominal removal time for the decoding unit comprises a nominal removal time of an ordinal first decoding unit of a previous buffering period plus a clock tick times a coded picture buffer removal delay associated with the ordinal $m^{th}$ decoding unit.

60. The apparatus of claim 43, wherein at least two stored decoding units of the plurality of stored decoding units include different numbers of coding blocks, and wherein the means for coding the video data corresponding to the plurality of removed decoding units comprises means for coding the different numbers of coding blocks in the at least two stored decoding units.

61. The apparatus of claim 43, wherein at least two stored decoding units of the plurality of stored decoding units include different numbers of bits, and wherein the means for coding the video data corresponding to the plurality of removed decoding units comprises means for coding the different numbers of bits in the at least two stored decoding units.

62. The apparatus of claim 43, wherein the apparatus comprises at least one of:
one or more integrated circuits;
one or more microprocessors;
one or more digital signal processors (DSPs);
one or more field programmable gate arrays (FPGAs);
a desktop computer;
a laptop computer;
a tablet computer;
a phone;
a television;
a camera;
a display device;
a digital media player;
a video game console;
a video game device;
a video streaming device; or
a wireless communication device.

63. A computer program product comprising a non-transitory computer-readable storage medium encoded with instructions stored thereon that, when executed, cause one or more processors of a video decoding device to:
store a plurality of decoding units associated with an access unit of video data in a picture buffer, decoding units being subsets of access units, and each decoding unit of the plurality comprising at least one video coding layer (VCL) network abstraction layer (NAL) unit of the access unit and any non-VCL NAL unit that is associated with the at least one VCL NAL unit;
obtain a respective buffer removal time for each stored decoding unit of the plurality of stored decoding units, wherein the instructions that cause the one or more processors to obtain the respective buffer removal time comprise instructions that cause the one or more processors to receive respective signaled information indicative of the respective buffer removal time for the respective stored decoding unit;
remove the plurality of stored decoding units from the picture buffer in accordance with the obtained buffer removal times; and
code the video data corresponding to the plurality of removed decoding units, wherein the instructions that cause the one or more processors to code the video data instructions that cause the one or more processors to decode the plurality of removed decoding units.

64. The computer program product of claim 63, wherein the non-transitory computer-readable storage medium further comprises instructions that, when executed, cause the one or more processors to store the plurality of decoding units of the video data in a continuous decoding order in the picture buffer.

65. The computer program product of claim 64, wherein the non-transitory computer-readable storage medium further comprises instructions that, when executed, cause the one or more processors to receive the plurality of decoding units of the video data in the continuous decoding order prior to storing the received one or more decoding units in the picture buffer.

66. The computer program product of claim 63, wherein the picture buffer is a coded picture buffer.

67. The computer program product of claim 66, wherein the non-transitory computer-readable storage medium further comprises instructions that, if executed, cause the one or more processors to remove a first decoding unit of the plurality of stored decoding units from the coded picture buffer prior to removing a second decoding unit of the plurality of stored decoding units from the coded picture buffer, wherein the first decoding unit and the second decoding unit comprise respective subsets of the access unit.

68. The computer program product of claim 63, wherein the respective signaled information indicative of the buffer removal time comprises a signaled value indicative of a number of network abstraction layer (NAL) units included in the respective stored decoding unit.

69. The computer program product of claim 63, wherein the plurality of decoding units comprise a plurality of sub-pictures of a common picture, and wherein the instructions that cause the one or more processors to receive the respective signaled information indicative of the respective buffer removal time comprise instructions that, when executed, cause the one or more processors to receive a respective signaled value indicative of the buffer removal time for each of the sub-pictures of the common picture.

70. The computer program product of claim 63, wherein the picture buffer is a coded picture buffer (CPB), and wherein the instructions that cause the one or more processors to receive the respective signaled information indicative of the buffer removal time comprise instructions that, plurality of executed, cause the one or more processors to receive respective signaled values indicative of one or more of an initial CPB removal delay at an access unit level, an initial CPB removal delay offset at the access unit level, an initial CPB removal delay at a sub-picture level, or an initial CPB removal delay offset at the sub-picture level.

71. The computer program product of claim 63, wherein the respective signaled information indicative of the buffer removal time is included in a picture timing supplemental enhancement information (SEI) message.

72. The computer program product of claim 63, wherein the respective signaled information indicative of the buffer removal time is included in a decoding unit timing supplemental enhancement information (SEI) message.

73. The computer program product of claim 63, wherein the instructions that cause the one or more processors to remove the plurality of stored decoding units from the picture buffer in accordance with the respective obtained buffer removal times comprise instructions that, when executed, cause the one or more processors to remove at least one stored decoding unit of the plurality of stored decoding units from the picture buffer after a respective obtained buffer removal time for the at least one stored decoding unit has passed since the at least one stored decoding unit was stored in the picture buffer.

74. The computer program product of claim 63, wherein each of the plurality of stored decoding units comprises one or more respective sub-pictures.

75. The computer program product of claim 74, wherein the non-transitory computer-readable storage medium further comprises instructions that, when executed, cause the one or more processors to receive a signaled value indicative of a byte alignment of at least one sub-picture of the one or more respective sub-pictures within a larger set of the video data, the larger set of the video data comprising the at least one sub-picture.

76. The computer program product of claim 75, wherein the larger set of the video data comprises at least one of an access unit, a subset of an access unit, a picture, a frame, a slice, a wave, or a tile.

77. The computer program product of claim 74, wherein each sub-picture of the one or more sub-pictures corresponds to at least one of one or more sequences of blocks of video data, one or more slices, one or more waves, one or more tiles, or one or more network abstraction layer (NAL) units.

78. The computer program product of claim 63, wherein the instructions that cause the one or more processors to obtain the respective buffer removal time for a respective stored decoding unit of the plurality of stored decoding units comprise instructions that, when executed, cause the one or more processors to perform one of:

determine, based on the respective decoding unit comprising an ordinal first decoding unit of the video data, that the buffer removal time comprises a coded picture buffer removal delay value specified in a buffering period supplemental enhancement information (SEI) message associated with an access unit that comprises the respective decoding unit; or determine, based on the respective decoding unit not comprising the ordinal first decoding unit of the video data, wherein the respective decoding unit comprises an ordinal $i^{th}$ decoding unit where i>0, that the buffer removal time comprises a decoding unit coded picture buffer removal delay [i] as specified in the picture timing SEI message associated with the access unit that comprises the respective decoding unit.

79. The computer program product of claim 63, wherein the instructions that cause the one or more processors to obtain the respective buffer removal time for a respective stored decoding unit of the plurality of stored decoding units comprises comprise instructions that, when executed, cause the one or more processors to perform one of:

determine, based on the respective decoding unit comprising an ordinal first decoding unit of an access unit of the video data, that a nominal removal time for the decoding unit comprises an initial coded picture buffer removal delay value divided by 90000; and determine, based on the respective decoding unit not comprising the ordinal first decoding unit of the access unit, wherein the decoding unit comprises an ordinal $m^{th}$ decoding unit where m>0 of the access unit, that a nominal removal time for the decoding unit comprises a nominal removal time of an ordinal first decoding unit of a previous buffering period plus a clock tick times a coded picture buffer removal delay associated with the ordinal $m^{th}$ decoding unit.

80. The computer program product of claim 63, wherein at least two stored decoding units of the plurality of stored decoding units include different numbers of coding blocks, and wherein the instructions that cause the one or more processors to code the video data corresponding to the plurality of removed decoding units comprise instructions that, if executed, cause the one or more processors to code the different numbers of coding blocks in the at least two stored decoding units.

81. The computer program product of claim 63, wherein at least two stored decoding units of the plurality of stored decoding units include different numbers of bits, and wherein the instructions that cause the one or more processors to code the video data corresponding to the plurality of removed decoding units comprise instructions that, if executed, cause the one or more processors to code the different numbers of bits in the at least two stored decoding units.

82. The device of claim 20, further comprising a display device configured to output at least a portion of the video data.

83. The apparatus of claim 43, further comprising means for outputting at least a portion of the video data for display.

* * * * *